(12) United States Patent
Morioka et al.

(10) Patent No.: US 8,448,697 B2
(45) Date of Patent: May 28, 2013

(54) COATING COMPOSITION, HEAT EXCHANGER, AND AIR-CONDITIONER

(75) Inventors: Reiji Morioka, Chiyoda-ku (JP);
Toshiaki Yoshikawa, Chiyoda-ku (JP);
Yasuhiro Yoshida, Chiyoda-ku (JP);
Yoshinori Yamamoto, Chiyoda-ku (JP);
Teruhiko Kumada, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1011 days.

(21) Appl. No.: 12/366,762

(22) Filed: Feb. 6, 2009

(65) Prior Publication Data

US 2009/0242177 A1   Oct. 1, 2009

(30) Foreign Application Priority Data

Mar. 28, 2008   (JP) .................. 2008-086678

(51) Int. Cl.
*F28F 19/02*   (2006.01)

(52) U.S. Cl.
USPC ... 165/133; 165/134.1; 165/905; 29/890.035; 29/458; 427/201; 427/204; 106/2; 106/287.28; 106/287.34; 106/491; 106/14.05; 524/492; 524/493

(58) Field of Classification Search
None
See application file for complete search history.

(56) References Cited

U.S. PATENT DOCUMENTS

| | | |
|---|---|---|
| 5,616,388 A | 4/1997 | Tatsuno et al. |
| 5,968,642 A | 10/1999 | Saito |
| 6,350,806 B1 | 2/2002 | Tsuda et al. |
| 2006/0251837 A1 | 11/2006 | Cnossen et al. |
| 2007/0237905 A1* | 10/2007 | Kawasaki et al. ........ 427/428.01 |

FOREIGN PATENT DOCUMENTS

| | | |
|---|---|---|
| CN | 1431454 | 7/2003 |
| EP | 0 903 389 | 3/1999 |
| EP | 2 112 207 | 10/2009 |
| JP | A-04-198287 | 7/1992 |
| JP | A-04-239636 | 8/1992 |
| JP | A-07-102207 | 4/1995 |
| JP | A-07-108319 | 4/1995 |
| JP | A-08-113756 | 5/1996 |
| JP | A-08-295844 | 11/1996 |
| JP | 10-047890 | 2/1998 |
| JP | 10-47890 A | 2/1998 |
| JP | 10-132483 | 5/1998 |
| JP | 10-132483 A | 5/1998 |
| JP | A-10-132483 | 5/1998 |

(Continued)

OTHER PUBLICATIONS

Y Yamada Abstract 02-167813 published on Jun. 28, 1990.*

(Continued)

*Primary Examiner* — Cheryl J Tyler
*Assistant Examiner* — Orlando E Aviles Bosques
(74) *Attorney, Agent, or Firm* — Posz Law Group, PLC

(57) ABSTRACT

A coating composition according to the present invention includes silica microparticles and fluorine resin particles. The coating film formed on a surface of an article includes a silica film composed of the silica microparticles, in which the fluorine resin particles are dotted so as to partially expose from a surface of the silica film, an exposed area of the silica film is larger than an exposed area of the fluorine resin particles, and amount of natrium contained in the coating composition is made equal to or less than 0.5% in a ratio by weight to contained amount of the silica microparticles.

17 Claims, 7 Drawing Sheets

FOREIGN PATENT DOCUMENTS

| | | |
|---|---|---|
| JP | A-10-316820 | 12/1998 |
| JP | A-11-001893 | 1/1999 |
| JP | A-11-124534 | 5/1999 |
| JP | 2000-074593 | 3/2000 |
| JP | 2000-74593 A | 3/2000 |
| JP | A-2001-026416 | 1/2001 |
| JP | 2001-088247 | 4/2001 |
| JP | 2001-88247 A | 4/2001 |
| JP | 2003-160681 | 6/2003 |
| JP | 2003-160681 A | 6/2003 |
| JP | 2003-201577 | 7/2003 |
| JP | A-2004-75757 | 3/2004 |
| JP | 2005-298837 | 10/2005 |
| JP | A-2006-519290 | 8/2006 |
| JP | A-2007-169682 | 7/2007 |
| WO | WO 99/21919 | 5/1999 |
| WO | WO 2008/087877 | 7/2008 |

OTHER PUBLICATIONS

European Search Report dated Nov. 29, 2010, issued in the corresponding European Patent Application No. 09250309.3-2102.

First Office Action issued in the corresponding Chinese Patent Application No. 200910009914.3 dated Mar. 22, 2010, and an English Translation thereof.

Office Action mailed Jan. 31, 2012 in corresponding JP application No. 2008-086678 (and partial English translation).

Office Action issued in the corresponding Australian Patent Application No. 2009200325 dated Feb. 19, 2010.

* cited by examiner

COATING COMPOSITION, HEAT EXCHANGER, AND AIR-CONDITIONER

BACKGROUND OF THE INVENTION

1. Field of the Invention

The present invention relates to a coating composition forming a coating film on the surface of articles, and in particular to a coating composition suitable to coating the surface of articles which are exposed to water such as a heat exchanger to be used in an air-conditioner.

2. Discussion of the Background

To the surface of kinds of articles used indoors/outdoors, various contamination such as powder dust, dust, greasy fume, tobacco tar, etc. stick. Therefore, kinds of methods for suppressing them have been proposed. For example, in order to suppress sticking of contamination of powder dust, a method for coating antistatic agent on the surface of articles to prevent electrostatically sticking of powder dust is known. Further, in order to suppress sticking of lipophilic contamination such as greasy fume, a method for coating oil-repellent fluorine resin on the surface of articles to prevent sticking of lipophilic contamination or to facilitate removing contamination is known.

However, in these methods, there is a problem that a coating film formed on the surface of articles by coating may be separated, property to prevent sticking of contamination may be degraded, and it is impossible to maintain the antifouling property for a long term. Therefore, another method for forming a surface in which a hydrophilic part and a hydrophobic part are mutually independently exposed in a minute region to maintain the antifouling property for a long term is attempted.

As one of examples, there is a method for coating the surface of articles with resin coating film having microphase-separated structure composed of hydrophilic part and hydrophobic part by applying coating composition including polymers having functional group, hydrophilic microparticles, metal alkoxide, and solvent on the surface of articles (refer to Patent Document 1, for example).

Further, for coating on the surface of a heat exchanger used for an air-conditioner, in order to prevent attachment of waterdrop of dewed water, antifouling coating composition, in which photocatalystic oxide and water-repellent fluorine resin are microscopically dispersed in a surface layer, exposed to contact outdoor air, and a contact angle θ with water of the surface of the layer is equal to or greater than 90 degrees, is proposed (refer to Patent Documents 2 and 3, for example).

Further, similar to the above, for coating on the surface of the heat exchanger, antifouling coating composition, in which a surface layer is composed of silica layer including microscopically dispersed photocatalystic oxide and water-repellent fluorine resin, and the amount of photocatalystic oxide is 10 to 80% by weight in the surface layer, and the amount of water-repellent fluorine resin is 20 to 60% by weight in the surface layer, is proposed (refer to Patent Document 4, for example).

Further, although not from the viewpoint of antifouling, in order to improve hydrophilia of the surface of heat exchanger, a method, in which the surface of heat exchanger is coated by triethanolamine solution, sodium carbonate solution, or ammonia water solution to make a contact angle θ with condensate water (dewed water) equal to or less than 10 degrees, is proposed (refer to Patent Document 5, for example).

LIST OF REFERENCES

[Patent Document 1] JP2003-160681
[Patent Document 2] JP10-132483
[Patent Document 3] JP10-47890
[Patent Document 4] JP2001-88247
[Patent Document 5] JP2000-74593

The coating film formed on the surface of article, which is exposed to water, such as the heat exchanger used for the air-conditioner requires not only antifouling property to suppress sticking of fouling substance, but also macroscopically high hydrophilia which allows water to spread on the surface avoiding to form waterdrops. However, it is hard to say that the conventional coating compositions satisfy both requirements of the antifouling property and the macroscopic hydrophilia.

The coating composition disclosed in Patent Document 1 is for preventing sticking of contamination to the surface of resin component, so that it is impossible to obtain high initial hydrophilia and continuous hydrophilic property to maintain high hydrophilic property for a long term, though the antifouling property can be obtained.

Further, Patent Documents 2 to 4 disclose the coating compositions to show hydrophilia partially due to photoexcitation generated by irradiating light to photocatalytic oxide, and there is a problem that insufficient light irradiation causes poor antifouling property. A contact angle θ of the coating film with water is equal to or greater than 90 degrees, so that the coating film prevents attachment of waterdrop as well as sticking of contamination, and thus it is impossible to obtain macroscopic hydrophilia which allows water spread on the surface avoiding to form waterdrops.

Coating composition for a heat exchanger disclosed in Patent Document 5 increases hydrophilia by containing large amount of OH group on the surface so as to make the contact angle θ with water equal to or less than 10 degrees. However, similarly to the coating by organic resin which is mixture of polyester and acrylate-resin which has been used conventionally and generally for coating composition for a heat exchanger, macroscopically hydrophilia is excellent, but antifouling property cannot be obtained.

The present invention is made to solve the above problems and aims to provide coating composition for forming a coating film having excellent antifouling property, initial hydrophilia, continuous hydrophilic property, a heat exchanger which can maintain high heat transfer efficiency using the coating composition and an air-conditioner.

SUMMARY OF THE INVENTION

According to the present invention, a coating composition for forming a coating film on a surface of an article includes: silica microparticles; and fluorine resin particles, the coating film is formed by a silica film composed of the silica microparticles in which the fluorine resin particles are dotted so as to partially expose from a surface of the silica film, and an exposed area of the silica film is larger than an exposed area of the fluorine resin particles, and amount of natrium contained in the coating composition is made equal to or less than 0.5% in a ratio by weight to contained amount of the silica microparticles.

In the coating composition, a ratio by weight of contained amount of the silica microparticles to contained amount of the fluorine resin particles is within a range of 60:40 to 95:5.

In the coating composition, an average particle diameter of the silica microparticles is within a range of 4 to 15 nm.

In the coating composition, an average particle diameter of the fluorine resin particles is within a range of 50 to 500 nm.

In the coating composition, the contained amount of the silica microparticles is 0.1 to 5% by weight to the coating composition.

In the coating composition, an initial contact angle θ of waterdrops attached to a surface of the coating film is equal to or less than 30 degrees.

In the coating composition, in the coating film an average thickness of the silica film is less than an average particle diameter of the fluorine resin particles.

In the coating composition, the coating composition is formed by mixing dispersion liquid of the silica microparticles and dispersion liquid of the fluorine resin particles, and amount of natrium contained in the dispersion liquid of the silica microparticles is made equal to or less than 0.5% by weight to the contained amount of the silica microparticles before or after mixing by hydrogen displacement with cation exchange.

According to another aspect of the invention, in a heat exchanger having a plurality of fins made of metal, which are aligned with a predetermined interval, and a metal piping which is provided in an inserted manner with forming plural lines penetrating the fins, and the heat exchanger is coated by one of the above coating compositions of the invention, and a coating film is formed by the coating composition at least on a surface of the fins.

According to another aspect of the invention, in an air conditioner having an indoor unit to be placed indoors and an outdoor unit to be placed outdoors, at least one of the indoor unit and the outdoor unit contains the above heat exchanger.

BRIEF DESCRIPTION OF THE DRAWINGS

A complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Embodiment 1

Hereinafter, coating composition according to the present invention will be explained with reference to the drawings. Here, a heat exchanger used for an air-conditioner is used as an embodiment of an article coated by a coating composition 20 according to the first embodiment of the present invention. A coating object of the coating composition 20 is, however, not limited to the heat exchanger, but can be applied to another substance as will be discussed later.

Figure 1:
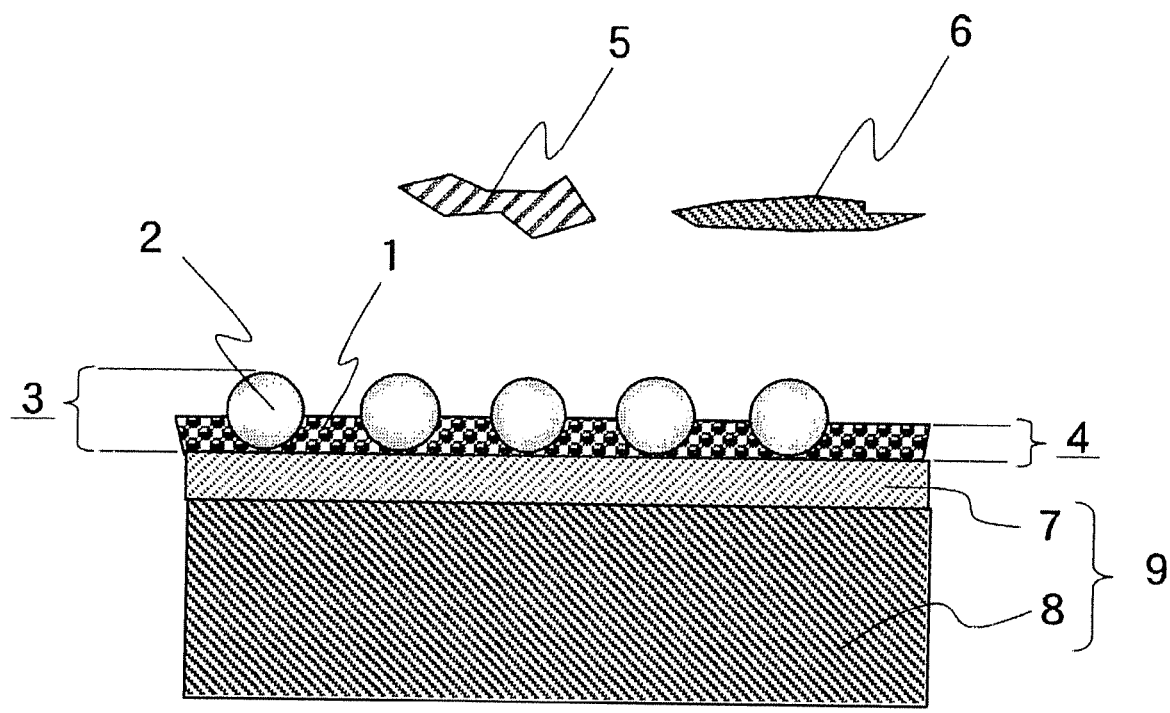
FIG. 1 is a conceptual diagram showing a cross section of coating composition according to the present invention when coated on the surface of a fin of a heat exchanger and a coating film is formed.
Figure 2:
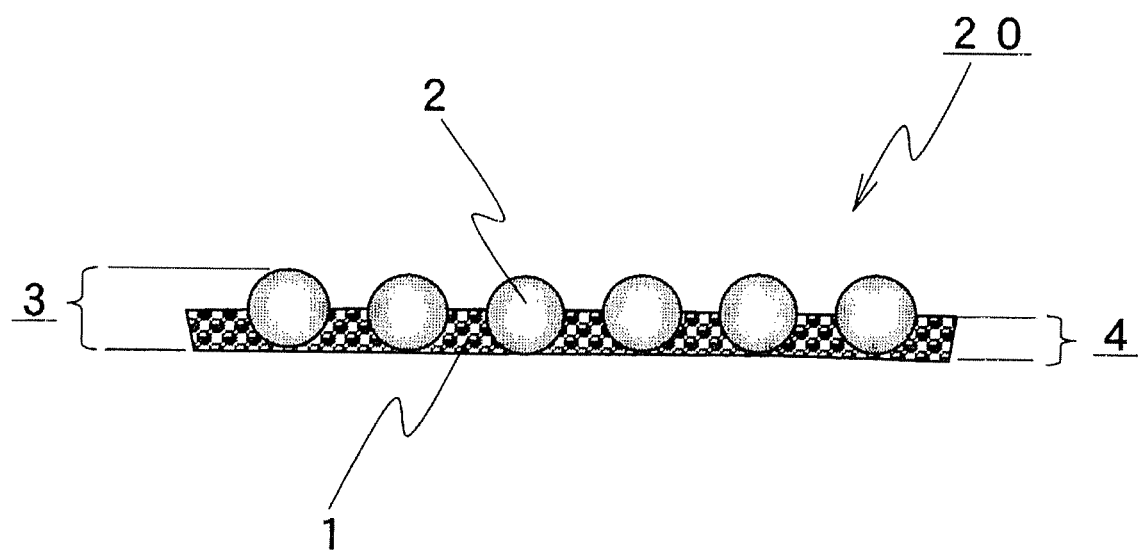
FIG. 2 is a conceptual diagram showing only the coating film of FIG. 1.
Figure 3:
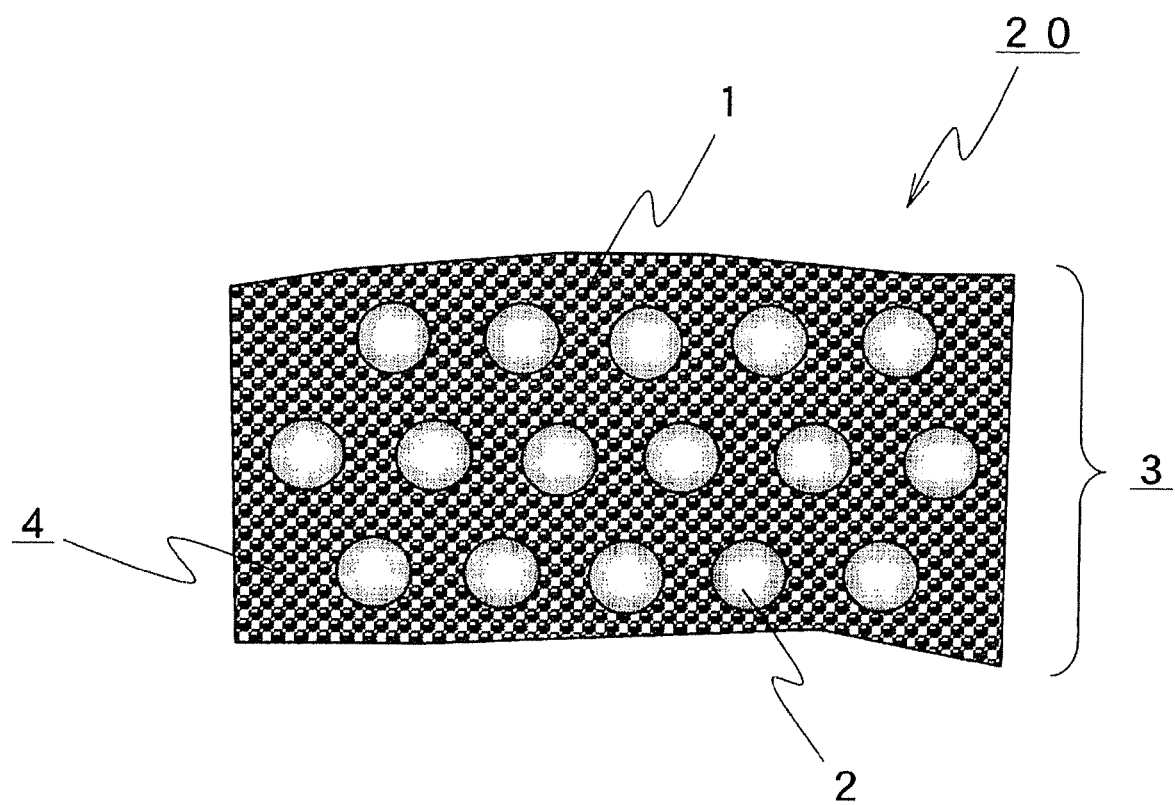
FIG. 3 is a conceptual diagram viewing from the upper surface of the coating film of FIG. 1.
Figure 4:
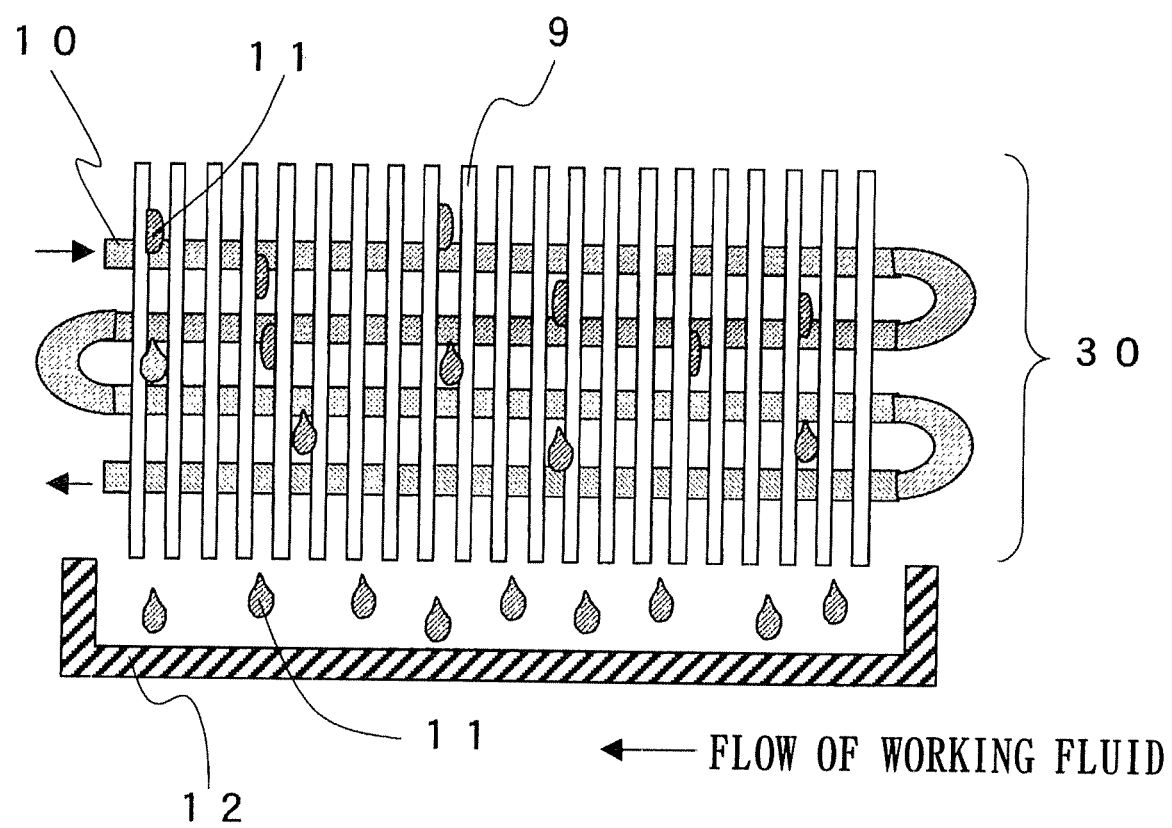
FIG. 4 is a model diagram showing a heat exchanger coated by the coating composition according to the present invention.

FIG. 1 is a conceptual diagram for explaining and showing a cross section of a coating composition 20 according to the present invention when the coating composition 20 is coated on the surface of a metal fin 9 of a heat exchanger which is an article to be coated and a coating film 3 is formed. FIG. 2 is a conceptual diagram showing only the coating film 3 composed of the coating composition 20 of FIG. 1; and FIG. 3 is a conceptual diagram viewing the upper surface of the coating film 3 of FIG. 1 or FIG. 2. FIGS. 1 through 3 all show the status in which the coating composition 20 is dried and the coating film 3 is formed. Further, FIG. 4 is a model diagram showing a heat exchanger 30 which is coated with the coating composition 20.

In the coating composition 20 according to the present invention, in the dried status, the coating film 3 is formed to include a hydrophilic silica film composed of the silica microparticles 1, which the hydrophobic fluorine resin particles 2 are dotted in and partially, not totally, exposed from.

The coating composition 20 is obtained by mixing water in which the silica microparticles 1 are dispersed (dispersion liquid) and water in which the fluorine resin particles 2 (dispersion liquid) are dispersed. Before the coating film 3 is formed, the silica microparticles 1 or the fluorine resin particles 2 are dispersed in the water; by applying the dispersion liquid (coating solution) on the surface of substance, or soaking the substance in the dispersion liquid, and then dehydrating to eliminate water, the coating film 3 is formed on the surface of substance. The silica film 4 of the coating film 3 maintains a bond of the silica Si and the oxygen O, which is a film having an OH group on the surface.

Here, as shown in FIG. 2, a covering layer formed on the surface of substance by the coating composition 20 is referred to as the coating film 3. In the coating film 3, the fluorine resin particles 2 are spotted in the silica film 4 composed of the silica microparticles 1, and the fluorine resin particles 2 are exposed partially, not totally, from the surface of the silica film 4. Further, here, the coating composition 20 is basically in the state of generally called coating solution which is the status of dispersion liquid discussed above.

An average particle diameter (an average diameter of particle) of the silica microparticles 1 used for the coating composition 20 is, when measured by the light scattering method, equal to or less than 15 nm, and preferably 4 to 12 nm. The particle diameter can be measured by the light scattering method. In the silica microparticles 1 which have such a minute average particle diameter, in the status of coating solution dispersed in water, all the surface contacting water is partially dissolved in the water (the contacted surface becomes substance of intermediate property between water and silica), and when the coating composition 20 is dehydrated, the partially dissolved silica component works as a binder (an agent to bind particles) to bind silica microparticles 1, so that the silica microparticles 1 are easily gathered and solidified after dehydration even if no specific binder is added. Therefore, it is possible to obtain the silica film 4 and further the coating film 3 which is excellent in strength such that it is hard to have a crack.

In the coating solution, in case of the silica microparticles 1, of which the average particle diameter is in the range of 4 to 15 nm, the surface part corresponding approximate 15 to 30% of the weight of the silica microparticles 1 is partially dissolved in water. However, in case of a silica particle, of which the average particle diameter exceeds 15 nm, the larger the average particle diameter becomes, the less the weight of the silica component partially dissolved in water becomes of the weight of the silica microparticles 1 in the coating solution, which makes it difficult to obtain an effect as the binder. Because of this, the coating film 3 to be formed does not include sufficient strength, and it is easy to have a crack, etc.

and therefore, it is not suitable to the coating film. Consequently, another binder needs to be added.

On the contrary, in case of a silica particle, of which the average particle diameter is less than 4 nm, in the coating solution, the ratio of the silica component partially dissolved in water becomes too high, so that the silica particles tend to gather in the coating solution, and therefore, it is hard to obtain the stability as the coating composition 20. Further, it is not possible to obtain desired strength of the silica film 4 (the coating film 3) formed after dehydration and the desired antifouling property which will be discussed later.

Further, the particle diameter of the silica microparticles 1 may affect an appearance trait such as transparency, etc. of the coating film 3 to be formed. In case of the silica microparticles 1, of which the average particle diameter is equal to or less than 15 nm, since the coating film 3 reduces the dispersion of reflected light, the transparency of the coating film 3 is increased, the change of color tone or texture of the article to be coated can be suppressed, and it is possible to prevent the article to be coated from losing the color tone or texture.

Further, as the silica particle, by using the silica microparticles 1 of which the average particle diameter is equal to or less than 15 nm, the obtained silica film 4 of the coating film 3 includes a minute gap between the silica microparticles, though it is dense. When compared with the conventional generally used silica film formed by silicate or using a sol-gel method, etc. without using microparticles or a silica film to which binder composed of soluble organic substance or mineral, the silica film 4 can be formed thinner, and smoother by reducing the irregularities of the surface of the silica film 4 caused by silica particles, which enables to improve antifouling property without catching fouling substance.

The contained amount of the silica microparticles 1 in the coating composition 20 is set to 0.1 to 5% by weight, preferably 0.3 to 2.5% by weight for the coating composition 20. By using the coating composition 20 having the contained amount (density) of this range, and coating is done in a method, in which liquid film is made on the surface of article to be coated (a heat exchanger 30, for example) by immersion coating or pouring coating, etc., excess coating solution is flushed away or removed forcibly and the liquid film is dried. The thickness of the formed coating film 3 is approximate 50 to 500 nm, and it is possible to form the silica film 4 with an even thickness without irregularities, so that the coating film 3 can be formed such that the color tone or texture of the surface of article to be coated would not be lost.

If the contained amount of the silica microparticles 1 is less than 0.1% by weight, the silica film 4 becomes so thin that the silica film 4 may partially suffer a loss, which may cause deficiency such that the surface of article to be coated is partially uncoated. That is, the coating solution is not suitable for the coating composition 20.

On the other hand, if the contained amount of the silica microparticles 1 exceeds 5% by weight, the silica film 4 becomes so thick that the film may be clouded, which may cause to lose the color tone or texture of the surface of article to be coated. Further, since the weight ratio of the silica microparticles 1 itself is large, it is difficult to obtain a binder effect caused by the silica component partially dissolved in water in the above coating resolution, the solidified state among the silica microparticles after dried becomes weak, and the strength of the coating film is weaken such that the silica film 4 may easily have a crack or the silica film 4 may be easily removed.

In the following, the fluorine resin particles 2 used for the coating composition 20 will be explained. In the coating film 3, the fluorine resin particles 2, which are dotted in the silica film 4 and are not totally but partially exposed from the silica film 4, having an average particle diameter (average of particle diameters) of 50 to 500 nm, preferably 100 to 250 nm are used. The measurement of the particle diameter can be done by the light scattering method. By using the fluorine resin particles having the particle diameter of this range, the particle diameter is larger than the thickness of the silica film 4, and in the coating film 3 to be formed, the fluorine resin particles 2 are dispersed in the silica film 4 appropriately, and the fluorine resin particles 2 are easily exposed partially on the surface of the coating film 3 (from the surface of the silica film 4), so that it is possible to obtain the desired status of the coating film 3.

If the fluorine resin particles are the ones having the average particle diameter being less than 50 nm, the stability of property cannot be maintained such that the fluorine resin particles themselves agglutinate or unite in the coating resolution. Further, in the coating film 3 to be formed, the fluorine resin particles 2 may be hardly exposed from the surface of the silica film 4, and the antifouling property, which will be discussed below, cannot be obtained.

On the other hand, if the fluorine resin particles are the ones having the average particle diameter exceeding 500 nm, a part of the fluorine resin particles exposed from the surface of the silica film 4 becomes large in the coating film 3 to be formed. If this happens, an area of a hydrophobic part becomes too large on the surface of the coating film 3, and antifouling property, which will be discussed below, cannot be obtained. Further, the irregularities of the surface of the coating film 3 become too large, fouling substance (contamination) is easily caught, and the attached fouling substance can hardly be removed.

In the coating film 3 formed on the surface of article to be coated by drying the coating composition 20, the thickness of the silica film 4 is less than the average particle diameter of the fluorine resin particles 2. By controlling the thickness of the silica film 4 to be thinner than the average particle diameter of the fluorine resin particles 2, the fluorine resin particles 2 are dotted appropriately in the silica film 4 in the coating film 3 to be formed, which makes the fluorine resin particles 2 easily exposed not totally but partially from the surface of the silica film 4, and the desired status of the coating film 3 can be obtained.

For example, when the fluorine resin particles 2 having the average particle diameter being 150 nm are used, the thickness of the silica film 4 is managed to be less than 100 nm. Namely, the thickness of the silica film 4 is made less than ⅔ of the average particle diameter of the fluorine resin particles 2. In this way, in order to form the silica film 4 into a thin film with less than 100 nm, before the silica microparticles 1 are solidified on the surface of article to be coated, the coating solution on the surface of article to be coated should be blown by strong airflow. By adjusting factors such as blowing speed, blowing time, or blowing temperature, etc., it is possible to manage the thickness of the silica film 4.

Ratio by weight of the silica microparticles 1 to the fluorine resin particles 2 in the coating composition 20 (weight of the silica microparticles 1: weight of the fluorine resin particles 2) is set to 60:40 through 95:5, and preferably 75:25. If the coating composition 20 has the ratio by weight like this range, it is possible to obtain the coating film 3 in which a hydrophilic area composed of the silica microparticles 1 (the silica film 4) and a hydrophobic area composed of the fluorine resin particles 2 are mixed in a balanced manner by drying at ambient temperature. To have the hydrophilic area and the hydrophobic area mixed in a balanced manner affects the antifouling property, which will be discussed later.

Hereinafter, the antifouling property (antifouling feature) by the coating film 3 formed with the coating composition 20 will be explained. Fouling substance is attached to the surface of article and stick to the surface of article without being removed, which forms contamination. Therefore, contamination on the surface of article can be prevented by avoiding attachment of the fouling substance to the surface of article, or even if attached, by removing such fouling substance from the surface before it sticks to the surface.

Like this, property to harden the fouling substance to stick to the surface or property to separate (remove) easily from the surface before it sticks to the surface even if the fouling substance is attached is referred to as the antifouling property. If the coating composition (coating film) enables the surface of article to have high antifouling property by coating the surface of article, such coating composition can be expressed as the coating composition (coating film) having high antifouling property. Here, to attach and to stick are used separately: to attach means a status of something when it can be easily removed from the surface afterwards including simply mounted on the surface; and to stick means a status of something when it can be hardly removed from the surface.

The fouling substance which generates contamination includes the hydrophilic fouling substance 5 and the hydrophobic fouling substance 6. The hydrophilic fouling substance 5 can easily attach to a hydrophilic part and hardly attach to a hydrophobic part. The opposite can be said for the hydrophobic fouling substance 6. The hydrophilic fouling substance 5 is such as sand dust or dust, etc., which attach to the hydrophilic part of the surface of article (including the surface of the coating film) by electrostatically binding between hydroxyl groups (OH group) which exist each in the hydrophilic fouling substance 5 and the hydrophilic part of the surface of article, or by intermolecular force due to the fact that the hydrophilic fouling substance 5 and the hydrophilic area of the surface of article get close, or further by liquid bridge due to the fact that liquid such as water, etc. intervenes.

Sand dust, which is the hydrophilic fouling substance 5 that is floating in the air, is a micro particle having the size of some µm through some tens µm. Further, dust, which is also the hydrophilic fouling substance 5, is extremely larger and has the size of 0.1 mm to 5 mm. In order to stick to the surface of article by such hydrophilic fouling substance 5 due to the above mentioned effects, it is necessary that the hydrophilic part of the surface of article should have a hydrophilic area large enough to adhere (contact) the hydrophilic fouling substance 5.

However, since in the coating film 3 formed by the coating composition 20 of the invention, the fluorine resin particles 2 showing hydrophobicity are moderately dispersed and dotted in the silica film 4 showing hydrophilia, there scarcely is a continuous area which is large enough to adhere for the hydrophilic fouling substance 5 such as sand dust in the surface of the silica film 4. The hydrophilic fouling substance 5 attached to the coating film 3 cannot sufficiently adhere to the surface of the silica film 4 because of the hydrophobicity of the surface of the fluorine resin particles 2 projected (exposed) from the silica film 4 or because of the physical inhibition of the fluorine resin particles 2 projected. Consequently, the hydrophilic fouling substance 5 separates easily and cannot stick to the coating film 3.

Further, since the silica film 4 is composed of the silica microparticles 1 (a role of the binder is also played by the silica component of the silica microparticles 1) and is a porous film having a minute gap between the silica microparticles 1, the density is small, and thus even if the hydrophilic fouling substance 5 is approaching, the hydrophilic fouling substance 5 can hardly stick because the intermolecular force is small.

Further, since the silica film 4 is a porous film having a minute gap between the silica microparticles 1, even if liquid bridge is generated because of water, etc., water between the hydrophilic fouling substance 5 and the surface of the silica film 4 is removed through the minute gap of the silica film 4 and the liquid bridge is eliminated, and thus the sticking of the hydrophilic fouling substance 5 because of the liquid bridge does not occur.

As discussed, the coating film 3 formed by the coating composition 20 exercises excellent antifouling property.

If the amount of the silica microparticles 1 in the coating composition 20 exceeds 95:5 in the ratio by weight of the silica microparticles 1 to the fluorine resin particles 2, intervals of the fluorine resin particles 2 dotted in the silica film 4 of the coating film 3 become large, and an exposed part of the surface of the silica film 4, having an area being large enough to be stuck stably by the small hydrophilic fouling substance 5 such as minute sand dust, appears, and thus the hydrophilic fouling substance 5 is possibly stuck to the surface of the silica film 4.

On the other hand, if intervals of the fluorine resin particles 2 dotted are large and a continuous part of the silica film 4 is large without interrupted by the fluorine resin particles 2, the hygroscopicity of the surface of the silica film 4 is increased, and thus charge electrified to the coating film 3 becomes easily leaked, which brings an advantage that the electrification of the surface of the coating film 3 can be efficiently suppressed. When the surface of article is electrified, a minute floating particle being fouling substance in the air, regardless of being hydrophilic or hydrophobic, is attracted by electrostatic attractive force and is easily attached to the surface of article.

In the coating composition 20, the ratio by weight of the silica microparticles 1 to the fluorine resin particles 2 is made 60:40 to 95:5, so that the silica film 4 of the coating film 3 formed by the coating composition 20 with this range includes the continuity being large enough to suppress the electrification; that is, the fluorine resin particles 2 are dotted with moderate intervals in the silica film 4 and such intervals enable the silica film 4 to have a continuous area being large enough to leak the charge, which brings an effect to prevent attachment of the floating particle (fouling substance) because of electrification. By coating the surface of article with the coating composition 20 to form the coating film 3 on the surface, it is also possible to prevent contamination caused by static electricity.

If the amount of the silica microparticles 1 in the coating composition 20 becomes less than 60:40 in the ratio by weight of the silica microparticles 1 to the fluorine resin particles 2, intervals of the fluorine resin particles 2 dotted in the silica film 4 become small, so that it is hard to obtain the effect to suppress the electrification by the continuous silica film 4 as discussed above and the accompanying effect to prevent contamination caused by static electricity, and thus the antifouling property is degraded.

The hydrophobic fouling substance 6 being another fouling substance is such as greasy fume, carbon, tobacco tar, etc., and among these, microparticles floating in the air cause contamination. The particle diameter is equal to or less than 5 µm, mostly 0.1 to 0.3 µm, which is smaller compared with the hydrophilic fouling substance 5. The hydrophobic fouling substance 6 can hardly stick to the hydrophilic surface since there exists hydrophilic group or absorbed water on the surface; the hydrophobic fouling substance 6 can easily stick to the hydrophobic surface. The reason why such hydrophobic fouling substance 6 sticks to the surface of article is because of the intermolecular force generated by adhesion of the hydrophobic fouling substance 6 to the hydrophobic surface.

The fluorine resin particles 2 having the average particle diameter of 50 to 500 nm show the hydrophobicity in the coating composition 20. The fluorine resin particles 2 may happen to have a larger particle diameter than a particle diameter of a single body because of deformation or union in the coating film 3 formed on the surface of article; however, in most cases, the particle diameter of the fluorine resin particles 2 is equal to or less than the size of the hydrophobic fouling substance 6 being a cause of contamination, and the fluorine resin particles 2 having the hydrophobic surface part do not include an area being large enough to adhere for the hydrophobic fouling substance 6.

In such a case, there is no intermolecular force which may cause to stick each other, and the hydrophobic fouling substance 6 can hardly stick to the hydrophobic fluorine resin particles 2. Needless to say, since the hydrophobic fouling substance 6 does not stick to the hydrophilic silica film 4, so that the coating film 3 exercises excellent antifouling property also for the hydrophilic fouling substance.

By only the fact that since the size (particle diameter) of the fluorine resin particles 2 is equal to or less than the size of the hydrophobic fouling substance 6, the hydrophobic fouling substance 6 cannot adhere to the fluorine resin particles 2 of the coating film 3 sufficiently, and thus the intermolecular force does not work to cause sticking, there still exists possibility that the hydrophobic fouling substance 6 partially adhere to the fluorine resin particles 2 and stick to the fluorine resin particles 2 by an effect of the intermolecular force. Further, the hydrophobic fouling substance 6 is sometimes smaller than the fluorine resin particles 2, and there may exist an area in the fluorine resin particles 2, in which hydrophobic fouling substance and the fluorine resin particles 2 should be adhered with each other.

However, this coating film 3 includes another effect to prevent the hydrophobic fouling substance 6 from sticking to the fluorine resin particles 2 other than discussed above, which makes such partial sticking or sticking of small hydrophobic fouling substance 6 difficult to occur. This effect will be explained in the following.

The surface of the fluorine resin particles 2 of the coating composition 20 shows hydrophilia by surfactant added at the time of polymerization of the fluorine resin, in the status of the dispersion liquid to water, or in the status of the coating solution mixed with dispersion liquid of the silica microparticles 1. When the coating composition 20 is dried to form the coating film 3, the surfactant is separated, and the surface of the fluorine resin particles 2 becomes hydrophobic; however, since the silica microparticles 1 coexist in the coating solution, the silica microparticles 1 having a smaller particle diameter than the fluorine resin particles 2 are attached sparsely to the surface of the fluorine resin particles 2 of the coating film 3 formed after dried.

In this way, the silica microparticles 1 including the hydrophilic group (showing hydrophilia) are attached dispersedly to the surface of the fluorine resin particles 2, so that partial sticking of the hydrophobic fouling substance 6 or sticking of the hydrophobic fouling substance 6 having a smaller particle diameter than the fluorine resin particles 2 hardly occurs on the surface of the fluorine resin particles 2. By partially introducing the hydrophilic group to the surface of the fluorine resin particles 2, it is possible to obtain an effect to suppress adhesion of the fluorine resin particles 2 and the hydrophobic fouling substance 6. In addition, even if the hydrophobic fouling substance 6 is attached to the surface of the fluorine resin particles 2, such attachment is unstable and is easily separated since the silica microparticles 1 are dispersedly attached.

On the other hand, the surface of the fluorine resin particles 2 to which the silica microparticles 1 are sparsely attached as discussed can exercise an effect as enough hydrophobicity for the hydrophilic fouling substance 5 having a much larger particle diameter compared with the size of the silica microparticles 1, and thus the hydrophilic fouling substance 5 cannot stick to the surface of the fluorine resin particles 2. Further, although the fluorine resin particles 2 have a soft surface, the surface of the fluorine resin particles 2 becomes hard because the silica microparticles 1 are sparsely attached, which brings an effect to make the hydrophilic fouling substance 5 difficult to adhere.

Further, since the fluorine resin itself, as it has been conventionally known as fluorine resin coating, includes very small surface energy and the friction coefficient is low, the fluorine resin shows not only hydrophobicity but also oil-repellent property, which makes the hydrophobic fouling substance 6 difficult to stick compared with another hydrophobic resin. That point is one of effects that the hydrophobic fouling substance 6 does not stick to the fluorine resin particles 2.

As discussed, the coating film 3 formed by the coating composition 20 exercises excellent antifouling property for the hydrophobic fouling substance 6.

When the amount of the fluorine resin particles 2 in the coating composition 20 exceeds 60:40 in the ratio by weight of the silica microparticles 1 to the fluorine resin particles 2, the surface area showing hydrophobicity of the fluorine resin particles 2 exposed in the coating film 3 becomes too large, the hydrophobic fouling substance 6 tends to stick to the coating film 3. Then, because a plenty of the fluorine resin particles 2 exist, and they are partially united, the coating film 3 becomes clouded, and the surface of article to be coated may lose the color tone or texture. Further, when the fluorine resin particles 2 are united, the continuity of the silica film 4 is interrupted.

Here, when the thickness of the silica film 4 is made larger (thicker) than the particle diameter of the fluorine resin particles 2, the silica film 4 showing hydrophilia is exposed as the surface of the coating film 3, which degrades the antifouling property for the hydrophilic fouling substance 5. Further, dispersion of the fluorine resin particles 2 into the silica film 4 is interrupted, the fluorine resin particles 2 are separated from the silica film 4 to precipitate on the surface of the silica film 4, the fluorine resin particles 2 themselves are united to form a lump, which locally degrades the hydrophilia at that point or causes the hydrophobic fouling substance 6 to stick. Therefore, as discussed above, the thickness of the silica film 4 is made smaller (thinner) than the average particle diameter of the fluorine resin particles 2, so that the fluorine resin particles 2 can be moderately dispersed in the silica film 4, and each of the fluorine resin particles 2 can be exposed partially not totally from the silica film 4.

As the fluorine resin particles 2 in the coating composition 20, PTFE (polytetrafluoroethylene), FEP (copolymer of tetrafluoroethylene and hexafluoropropylene), PFA (copolymer of tetrafluoroethylene and perfluoro alkyl vinyl ether), ETFE (copolymer of ethylene and tetrafluoroethylene), ECTFE(copolymer of ethylene and chlorotrifluoroethylene), PVDF (polyvinylidene-fluoride), PCTFE (polychlorotrifluoroethylene), PVF (polyvinyl-fluoride), etc., and their copolymer or their mixture, or their mixture with another resin can be used.

The fluorine resin particles 2 need to be in the status of dispersion liquid, in which the fluorine resin particle 2 is dispersed in water before composing the coating composition 20. A method to disperse can be done by using the fluorine resin particles 2 polymerized by suspension polymerization or emulsion polymerization and applying the surfactant. In the status of being dispersed in water, the surface of the fluorine resin particles 2 has low hydrophobicity; however, it is sufficient that the surface becomes hydrophobic in the status after dried and solidified (the coating film 3). As for the fluorine resin to be used, in particular among the above, PTFE and FEP are preferable since they are excellent in stability such that they do not agglutinate in dispersion liquid or coating solution, and they have high hydrophobicity when dried to form the coating film 3.

As has been discussed, the coating film 3 formed on the surface of article by the coating composition 20 would not allow both the hydrophilic fouling substance 5 and the hydrophobic fouling substance 6 to stick, and if they attach, it is easy to make them separate. Thus, the coating film 3 exercises excellent antifouling property to prevent the surface of article from contamination. In the embodiments (experimental result) discussed later, it will be proven that the antifouling property of the coating composition 20 of the invention is excellent.

Hereinbefore, the antifouling property of the coating composition 20 according to the invention has been mainly discussed. In the embodiment, a heat exchanger, which is frequently exposed to water, is used as an embodiment of an article to be coated by the coating composition 20. This is because the heat exchanger, which requires not only antifouling property but also high initial hydrophilia and continuous hydrophilic property, is a very suitable article to be coated by the coating composition 20. Hereinafter, it will be explained that the coating composition 20 is excellent not only in antifouling property but also in the initial hydrophilia and continuous hydrophilic property. Here, the continuous hydrophilic property means a property to maintain the hydrophilia within a satisfactory range after a certain time period has passed without degrading the initial hydrophilia drastically.

Here, as has been explained above, the coating film 3 formed on the surface of article by the coating composition 20 includes excellent antifouling property, so that it is possible to satisfy the requirement of antifouling property, which is required by an article that does not require specifically high hydrophilia but mainly requires antifouling property of the coating film 3, since the coating film 3 can prevent the surface of article from contamination with its excellent antifouling property.

Before explaining that the coating composition 20 is excellent in the hydrophilia and the continuous hydrophilic property, the heat exchanger 30 will be explained with reference to FIG. 4. The surface of the heat exchanger 30 is coated by the coating composition 20, and the coating film 3 is formed on the surface. The heat exchanger 30, which is used in an air-conditioner having a cooling cycle, heat exchanges working fluid such as refrigerant flowing in the cooling cycle with air passing through the heat exchanger 30.

The basic structure includes, as shown in FIG. 4, a plurality of thin plate fins 9 aligned to be in parallel to each other (located in parallel) and a metal piping 10 which is provided in an inserted manner with forming plural lines penetrating the fins 9. The fins 9 are generally aligned in parallel; however, they can be aligned in a corrugated form. The fins 9 are made of metal, and aluminum is largely used as their material. Further, a copper pipe is used as the material for the piping 10, here.

The working fluid such as refrigerant, etc., flowing in the cooling cycle, flows in the piping 10, using the piping 10 and the metal fins 9 as medium, and the working fluid and the air, which is introduced to an air blower (not illustrated) arranged adjacent to the heat exchanger 30 and passes through the heat exchanger 30, exchange heat. In this heat exchanger 30, when heat exchange is done in such a way that heat is removed from the passing air to cause the working fluid to evaporate, and the temperature of the passing air is decreased, for example, when this heat exchanger 30 is mounted on an indoor unit of an air-conditioner provided indoors, the operation to cool or dry a room is carried out, and the heat exchanger 30 works as an evaporator, hot and humid air is converted to cool air by passing through the heat exchanger 30, and the air reaches a dew point. Then, dew condensation occurs, and dewed water is attached to the surface of the fins 9 as waterdrops 11.

The attached waterdrops 11 finally go on the surface of the fins 9 by gravity force, fall down to a drain-pan 12 (drip pan) provided below the heat exchanger 30, and accumulate there. Then, passing through a drainage water channel, not illustrated, from the drain-pan 12, the waterdrops 11 are discharged to a predetermined place such as outdoors, etc. When the dewed waterdrops 11 are attached to the surface of the fins 9, if the surface of the fins 9 has low hydrophilia, a contact angle θ of the attached waterdrops 11 becomes large. In a part where the waterdrops 11 exist, a width between the fins 9 located next to each other is decreased essentially by the amount of waterdrops 11. Depending on the size of the contact angle θ, a waterdrop 11 may bridge the fins 9 located next to each other; that is, the waterdrop 11 sometimes bridges over the fins 9 located next to each other without being split and is attached to both surfaces of facing fins.

Figure 5A:
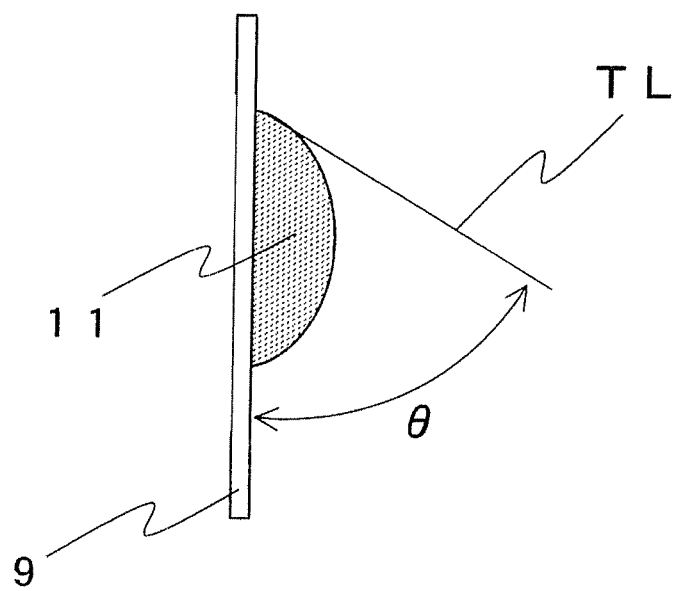
FIGS. 5A and 5B are model diagrams explaining a contact angle θ of a waterdrop attached to the surface of the fin.
Figure 5B:
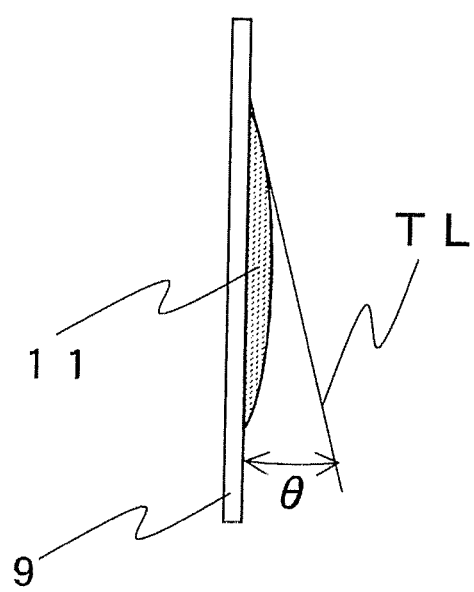

FIGS. 5A and 5B are model diagrams for explaining the contact angle θ of the waterdrop 11. Here, the contact angle θ is, as shown in FIGS. 5A and 5B, an angle formed by a tangent line TL of the waterdrop 11, which has been dewed and attached to the surface of the fin 9, and the surface of the fin 9 at a contacting part of the waterdrop with the surface of the fin. The smaller the contact angle θ is, namely, the closer to 0 degree the contact angle θ becomes, the flatter the attached waterdrop 11 spreads on the surface of the fin 9. Then, high hydrophilia means that the attached waterdrop 11 easily spreads. Namely, the smaller the contact angle θ is (the closer to 0 degree the contact angle θ becomes), the higher the hydrophilia is, in other words, the excellent hydrophilia is obtained. In the figures, the contact angle θ of the waterdrop 11 shown in FIG. 5A is smaller than the waterdrop 11 shown in FIG. 5B. Further, it can be said that the continuous hydrophilic property is a feature to maintain the contact angle θ within a satisfactory range after a certain time period has passed without increasing drastically the initial contact angle θ.

The larger the contact angle θ of the attached waterdrop 11 is, the narrower the width between the fins 9 located next to each other in the part where the waterdrop 11 exists becomes, which restricts the airflow passing through the heat exchanger, the pressure loss of the air passage is increased, and the heat transfer efficiency of the heat exchanger is degraded. Further, in case of bridging the fins, the pressure loss is extremely large, which degrades the heat transfer efficiency of the heat exchanger drastically. If the heat transfer efficiency of the heat exchanger is degraded, input from the air blower which passes the air is increased, and the performance of the air-conditioner which mounts the heat exchanger is degraded.

Further, if the waterdrop 11 bridges the fins 8 located next to each other, frictional resistance with the fins 9 works against fall on both of the attached surfaces, so that the waterdrop 11 hardly falls, that is, drainage is degraded, the time period in which the attached waterdrop 11 restricts the airflow may be long, and thus the heat transfer efficiency of the heat exchanger is further decreased.

Further, the waterdrop 11, which is attached to the fin 9 but does not spread and of which the contact angle θ is large, is separated from the surface of the fin 9 by the airflow generated by the air blower (blowing effect), and flown with the airflow in the status of the waterdrop 11; that is, so-called waterdrop flying phenomena easily occurs. When such waterdrop happens to fly from the heat exchanger arranged in the indoor unit of the air-conditioner, the waterdrop 11 is blown indoors together with the cooled conditioned air, and if such waterdrop 11 hits directly skin of the user, the user feels discomfort. Further, if the blown out waterdrop 11 is attached to the ceiling or wall surface, and such status lasts long, a problem occurs that the attached part may get moldy or corroded.

Further, if the contact angle θ of the waterdrop 11 attached to the fin 9 is large, or if the waterdrop 11 bridges the fins located next to each other to increase the pressure loss of the air passage, in the indoor unit of the air-conditioner where a crossflow fan is provided at the downstream side of the heat exchanger as the air blower, the air blown out from the air outlet of the indoor unit blows back to the indoor unit again, which causes a problem that an abnormal sound may occur. This abnormal sound is called surging sound.

Therefore, the heat exchanger, especially the fins 9 require high hydrophilia in order to maintain the heat transfer efficiency of the heat exchanger high and as well to prevent waterdrop flying from the indoor unit of the air-conditioner or the abnormal sound because of the blow back of the blowing air. Conventionally, in order to satisfy such requirement, organic resin such as polyvinyl alcohol including acryl is coated on the surface of the fins 9. However, this coating by the organic resin cannot obtain the antifouling property as shown in embodiments (experimental results) which will be discussed later.

The coating composition 20 includes the silica microparticles 1 and the fluorine resin particles 2 with the ratio by weight within a range of 60:40 through 95:5. Therefore, in the coating film 3 formed by the coating composition 20, the exposed area of the silica film 4 showing the hydrophilia is sufficiently large compared with the exposed area of the fluorine resin particles 2 which are dotted in the silica film 4 and partially exposed from the surface of the coating film 3. Further, since the fluorine resin particles 2 are dotted, the silica film 4 is structured to have a large continuous area without being interrupted by the fluorine resin particles 2.

Since the coating film 3 is structured like this, in the heat exchanger 30 which is the heat exchanger coated by the coating composition 20, the coating film 3 is formed on the surface of the fins 9. Therefore, when the dewed waterdrops 11 are attached to the surface of the fins 9, the waterdrops 11 easily spread since the surface includes a large continuous hydrophilic area composed of the silica film 4, and thus the contact angle θ of the waterdrops 11 can be made small. Namely, the coating film 3 can show high hydrophilia for the attached waterdrops 11. Further, since the silica film 4 continues without being interrupted by the fluorine resin particles 2, the waterdrops 11 of which the contact angle θ is small, can run along the silica film 4 to fall down, which brings good drainage.

If the fluorine resin particles 2 dotted in the silica film 4 are united to be connected, are arranged close to each other, are exposed largely, or irregularly distributed so that a lot of fluorine resin particles are arranged locally, spreading of the waterdrops 11 on the surface of the silica film 4 should be prevented. However, in the coating film 3 by the coating composition 20, it is structured to have the fluorine resin particles 2 moderately distributed and dotted, so that while maintaining high hydrophilia that allows water to easily spread, in a microscopic area related to sticking of the hydrophilic fouling substance 5 and the hydrophobic fouling substance 6, the hydrophilic part and the hydrophobic part coexist in the surface, which enables to exercise high antifouling property that prevents sticking of both of the hydrophilic fouling substance 5 and the hydrophobic fouling substance 6.

Further, the surface of the coating film 3 structured like this allows water to easily move, so that the attached waterdrops 11 move at the time of drainage, which makes the hydrophilic fouling substance 5 and the hydrophobic fouling substance 6 attached to the surface of the coating film 3 float to separate from the surface of the coating film 3, and the hydrophilic fouling substance 5 and the hydrophobic fouling substance 6 can be removed together with the drainage of the waterdrops 11; that is, it is possible to obtain an excellent effect in the point of antifouling.

When the coating film 3 is formed on the surface of the fins 9 of the heat exchanger 30 by coating with the coating composition 20, in detail as shown in FIG. 1, the fins 9 made of metal are formed by coating a corrosion preventing layer 7, which is formed on a metal layer 8 being material of the fins 9 (aluminum layer, if the fins 9 are made of aluminum) by chromate treatment, with the coating film 3.

In order to suppress the degradation of the heat transfer efficiency of the heat exchanger 30 and to prevent generation of the waterdrop flying or generation of abnormal sound because of blowback of the air blown after passing the heat exchanger 30 by the air blower, the contact angle θ of the the waterdrops 11 attached to the surface of the metal fins 9 for the heat exchanger 30 needs to be controlled so that it should be equal to or less than 40 degrees. In order to suppress the degradation of the heat transfer efficiency of the heat exchanger 30, needless to say, the smaller (closer to 0 degree) the contact angle θ is, the better it is. Further, as will be discussed later, since the hydrophilia of the coating film 3 becomes gradually degraded over a long term, even if it is tried to suppress the degree of degradation, in order to control the contact angle θ so that is should be always equal to or less than 40 degrees, it is preferable that the initial contact angle θ, that is, the contact angle θ at the time of starting the use of the air-conditioner should be equal to or less than 30 degrees.

If the amount of the silica microparticles 1 in the coating composition 20 exceeds 50:50 in the ratio by weight of the silica microparticles 1 to the fluorine resin particles 2, the initial contact angle θ of the attached waterdrops 11 satisfies the condition being equal to or less than 30 degrees, so that it is possible to make attached dewed water spread flatly and as well easily discharge water to the drain-pan 12 (drip pan).

However, the air-conditioner is required to work more than 10 years, when the hydrophilia over such long years is considered, the longer the duration of use is, the smaller the contact angle θ becomes even if the initial contact angle θ is at a satisfactory level, since more than a few silica microparticles 1 are gradually resolved into the attached waterdrops 11 (dewed water). As shown in the embodiments (experimental results) which will be discussed later, when the amount of the silica microparticles 1 in the coating composition 20 is equal to or less than 50:50 in the ratio by weight of the silica microparticles 1 to the fluorine resin particles 2, it appears clearly that the contact angle θ tends to increase from the initial contact angle θ after the running water experiment corresponding to 10 years is carried out.

As shown in the embodiments (experimental results) which will be discussed later, when the amount of the silica microparticles 1 in the coating composition 20 is equal to or greater than 60:40 in the ratio by weight of the silica microparticles 1 to the fluorine resin particles 2, preferably 75:25, so that the hydrophilic area of the silica film 4 is made sufficiently large compared with the area of the fluorine resin particles 2 dotted in the silica film 4 and exposed from the surface of the coating film 3, it is possible to suppress the increase of the contact angle θ within the satisfactory range (equal to or less than 40 degrees) after the running water experiment in which the coating film 3 is exposed to water corresponding to 10 years is carried out.

Then, in order to secure the continuous hydrophilic property of the coating film 3 for a long term which corresponds to the product life of the air-conditioner, it is important to control not only the ratio by weight of the silica microparticles 1 to the fluorine resin particles 2 as discussed above, but also the contained amount (concentration) of natrium included as impurities which will be discussed below.

On manufacturing the coating composition 20, it cannot be denied that some impurities may be mixed in the coating composition 20, since they are already included in raw materials and additives, etc. There is no problem if the mixed impurities do not agglutinate or precipitate the silica microparticles 1 or the fluorine resin particles 2, or exert no harmful effect to the antifouling property of the coating film 3 and the hydrophilia or the continuous hydrophilic property of the silica film 4.

However, in case of the heat exchanger 30 which is used under the circumstance where the coating film 3 is exposed to water, a lot of natrium mixed as the impurities exerts harmful effect on the continuous hydrophilic property, and thus it is important that the coating composition 20 should not include much mixture of natrium. This is because when the coating composition 20 includes much natrium, the amount of silica to be resolved into the waterdrops 11 from the silica film 4 increases by being accelerated by resolution of natrium, since natrium is hydrosoluble and natrium tends to positively dissolve into the attached waterdrops 11. This tendency is remarkable as shown in the embodiments which will be discussed later.

Because of this, if the coating composition 20 includes much natrium, the resolution of silica to the attached water is accelerated, the silica film 4 loses the hydrophilia, and the contact angle θ increases. Namely, such coating film cannot maintain the satisfactory continuous hydrophilic property. Further, as the balance of the hydrophilia by the silica film 4 and the hydrophobicity by the fluorine resin particles 2 changes, the antifouling property may be degraded. When the air-conditioner is used for 10 years, the heat exchanger 30 mounted on the indoor unit is to be exposed to equal to or more than approximate 10,000 L, so that it must be prevented that the silica film 4 drastically loses the hydrophilia.

As shown in the embodiments which will be discussed later, when the amount of natrium contained in the coating composition 20 is equal to or greater than 1.0% in the ratio (ratio by weight) of natrium to the silica microparticles 1 (Embodiment 1), the hydrophilia tends to decrease (increase the contact angle θ to exceed the allowable level); if the ratio by weight of the natrium to the silica microparticles 1 is made equal to or less than 0.5% (Embodiment 2), the increase of the contact angle θ is suppressed after exposed to water of equal to or greater than 10,000 L, which enables to maintain the contact angle θ equal to or less than 40 degrees. As shown in the embodiments, in order to surely maintain the contact angle θ equal to or less than 40 degrees, it is preferable to make the ratio by weight of natrium to the silica microparticles 1 equal to or less than 0.1% (Embodiment 3). The less the natrium is mixed to the coating composition 20, the better it is.

Like this, the area of the silica film 4 is made sufficiently large compared with the area of the fluorine resin particles 2 dotted in the silica film 4 and exposed from the surface of the coating film 3, the amount of natrium included in the coating composition 20 is made equal to or less than 0.5%, preferably equal to or less than 0.1% in the ratio by weight to the silica microparticles, and thus the contact angle θ of the waterdrops 11 (dewed water) attached to the heat exchanger 30 can be suppressed to be equal to or less than 40 degrees, which satisfies the continuous hydrophilic property required for the coating film 3. Namely, the dewed water can be discharged early, for the long life term, the degradation of the heat transfer efficiency of the heat exchanger can be suppressed, and thus it is possible to prevent the waterdrop flying or generation of the abnormal sound because of the blow back of the blown air.

As has been discussed, by making the area of the silica film 4 in the coating film 3 sufficiently large compared with the area of the fluorine resin particles 2 dotted in the silica film 4 and exposed from the surface of the coating film 3, and controlling the amount of natrium to be mixed to the coating composition 20 as impurities to be equal to or less than 0.5%, preferably 0.1% in the ratio by weight, the coating film 3 can have excellent initial hydrophilia and continuous hydrophilic property for a long term. Namely, the initial contact angle θ of the waterdrops 11 attached to the surface of the coating film 3 is made equal to or less than 30 degrees, and further, the initial contact angle θ of the waterdrops 11 attached to the surface of the coating film 3 can be maintained to be equal to or less than 40 degrees after exposed to water corresponding to the product life of the air-conditioner.

Further, although discussion will be separated from the antifouling property, the hydrophilia, and the continuous hydrophilic property, if the amount of natrium contained in the coating composition 20 as impurities is large, it is confirmed that the coating film 3 tends to easily absorb organic acid. If the coating film 3 absorbs a large amount of calboxylic acid having COOH-group which is one of the organic acids, the absorbed acidic calboxylic acid dissolved in the waterdrops 11 (dewed water) attached to the surface of the fins 9, and thus the attached waterdrops 11 possibly happen to be more acidic than pH 4 (hydrogen-ion exponent is 4) which is acid dissolution point of the piping 10 (copper pipe).

If the highly acidic waterdrops 11 being less than pH 4 contact the copper pipe being the piping 10, the contacting point possibly becomes a starting point of ant nest corrosion, the corrosion grows from that starting point, the copper pipe may have a hole, from which the working fluid flowing in the piping 10 such as the refrigerant, etc. may leak to the outside. Such an event must be prevented from the viewpoint of protection of environment, and also from the viewpoint of safety according to the kind of the working fluid. Among calboxylic acid, formic acid (HCOOH) brings the most harmful effect to allow the ant nest corrosion to grow. The formic acid is contained in building material such as wallpaper, etc. and adhesion bond for bonding them, and there is much formic acid floating in the air.

As shown in the embodiments (experimental results) which will be discussed later, when liquid glass (also referred to as silicate soda, $SiO_2/Na_2O$) in which the ratio by weight of natruim to silica is extremely high, approximate 30%, is used for carrying out hydrophilic coating to form a coating film on the surface (Comparison Example 1), the absorbed amount of formic acid of the coating film is very large. Concretely, compared with the coating film 3 (Embodiment 2) formed by the coating composition 20 in which the ratio by weight of natruim to silica is 0.5%, it is verified that the film of Comparison Example 1 absorbs equal to or greater than 25 times of amount per unit area.

Further, a coating film in which the ratio by weight of natruim to silica exceeds 0.5% (in case of the ratio by weight 1.3% in Embodiment 1) absorbs nearly three times of formic acid compared with the coating film in which the ratio by weight of natruim to silica is 0.5% (Embodiment 2), and thus the attached waterdrops 11 (dewed water) possibly become less than pH 4 according to the environmental concentration of ambient formic acid. The larger the ratio by weight of natrium to silica is, the higher the absorbed amount of formic acid per unit area becomes, because calboxylic acid including formic acid is acidic substance and natrium being alkarine in the coating film absorbs such acidic substance.

By making the ratio by weight of natrium to silica equal to or less than 0.5%, the waterdrops 11 would not become equal to or less than pH 4 and the acid dissolution of the piping 10 (copper pipe) by the waterdrops 11 would not occur even if the ambient formic acid environment is 5 ppm which is the maximum value of the environmental concentration. The absorbed amount of formic acid by a coating film in which the ratio by weight of natruim to silica is made equal to or less than 0.1% (Embodiment 3) is the same with a coating film including no natrium (Comparison Example 2), and there is no recognizable increase of the absorbed amount of formic acid regardless of existence/absence of the coating film 3.

As has been discussed, by managing the amount of natrium contained in the coating composition 20 as impurities equal to or less than 0.5% in the ratio by weight to silica microparticles, the absorbed amount of formic acid of the coating film 3 to be formed can be suppressed, so that it is possible to avoid generation of acid dissolution of the copper pipe which is the piping 10 of the heat exchanger 30. In detail, if the ambient formic acid environment is 5 ppm which is the maximum value of the environmental concentration, the pH value of the waterdrops 11 (dewed water) attached to the fins 9 would not become less than 4, and thus such waterdrops 11 would not be a starting point of ant nest corrosion even if the waterdrops 11 contact the piping 10 (copper pipe). Therefore, it is possible to avoid corrosion of the copper pipe due to the absorption of calboxylic acid including formic acid and further leak of working fluid from a hole which may be opened at the copper pipe due to the growth of the corrosion.

When the coating film absorbs much organic steam, and if the absorbed organic stream is slowly released by change of temperature, etc., a person under such environment may feel uncomfortable by its smell or get dizzy. When volatile chemical substances such as α pinene and 2-ethyl 1-hexanol, and organic acid caused by grease, a human or cosmetics such as stearic acid and palmitic acid are absorbed, it is anticipated that the article to be coated or surrounding material may easily get corroded or discolored. Further, if such organic acid is absorbed, the coating film tends to become water-repellant. When the heat exchanger, which has become water-repellant, is examined, these organic acid and volatile chemical substance are observed. Therefore, in the heat exchanger, this status may proceed to generate waterdrop flying or abnormal sound (surging sound) due to the blowback of blown air.

As a countermeasure for these, it is preferable to make the ratio by weight of natrium to silica equal to or less than 0.5% in the coating composition 20. Similar to the case of formic acid, by making the contained amount of alkaline natrium in the coating film 3 to be formed very small amount, it is possible to eliminate the absorption of grease system acidic gas such as acidic stearic acid and palmitic acid. Compared with the coating film by the conventional organic resin system hydrophilic coating, it is possible to reduce the absorbed amount of the grease system acid gas by approximate 1.0 to 50%. Further, in a volatile chemical substance exposure test, in which the volatile chemical substance such as a pinene and 2-ethyl 1-hexanol and a coated test slip are put together in a pressure-resistant container, the absorbed amount of the test slip coated by the coating composition 20 of the invention can be reduced by approximate 10 to 50% compared with a test slip on which the conventional organic resin system hydrophilic coating is applied.

As a method of composing the coating composition 20 of the invention, without specific limitation, it is possible to easily compose by mixing dispersion liquid of the silica microparticles 1 and dispersion liquid of the fluorine resin particle 2. Here, for the dispersion liquid of the silica microparticles 1, the one in which the silica microparticles 1 having the average particle diameter of equal to or less than 15 nm are dispersed in water such as, for example, colloidal silica being available in the market can be used. In the dispersion liquid of the silica microparticles, the ratio by volume of the silica microparticles 1 in the dispersion liquid is preferably equal to or less than 20%. This is because if the ratio by volume exceeds 20%, the stability of the dispersion liquid may be degraded such that the silica microparticles 1 may agglutinate.

Further, for the dispersion liquid of the fluorine resin particles 2, the one in which the fluorine resin particles 2 having the average particle diameter of equal to or less than 500 nm are dispersed in water such as, for example, PTFE dispersion can be used. Here, in order to disperse uniformly the hydrophobic fluorine resin particles 2 in the coating composition 20 without agglutination, surfactant can be added. In both dispersion liquids, polar solvent is not limited to water.

As water to be used for both dispersion liquid, without specific limitation, it is preferable to use water including little ionic impurities such as calcium ion, magnesium ion, etc. in order to disperse and keep stably without agglutination of the silica microparticles 1 or the fluorine resin particles 2. At least bivalent ionic impurities is preferably equal to or less than 200 ppm, and more desirably, equal to or less than 50 ppm. If at least bivalent ionic impurities increase, the silica microparticles 1 or the fluorine resin particles 2 may agglutinate and precipitate, and the strength or the transparency of the formed coating film 3 may be degraded.

The coating composition 20 does not include organic solvent, so that it is safe and environment friendly. Further, as discussed above, it can be composed only by mixing the dispersion liquid being available in the market, which is an advantage that the coating composition can be composed easily at a low cost.

However, surfactant or organic solvent can be added to the coating composition 20 from a viewpoint of improving adhesion of the coating film 3 to be formed and adjusting the hydrophilia of the coating film 3 according to maintaining stability of the hydrophobic fluorine resin particle 2 or material of an article to be coated. Further, coupling agent or silicon analog can be added to the coating composition 20 in order to improve adhesion, transparency, or strength of the coating film 3 to be formed and further to adjust the hydrophilia of the coating film 3.

Here, surfactant of various anionic system or nonionic system can be noted as the surfactant which can be used for the coating composition 20. Among these surfactants, polyoxypropylene-polyoxyethylene block polymer, polycarboxylic acid type anion system surfactant, etc. are preferable, since they have low foaming property and are easy to use.

Further, various kinds of organic solvent of alcohol system, glycol system, ester system, ether system, etc. can be noted as the organic solvent which can be used for the coating composition 20.

Further, amino system such as 3-(2-aminoethyle)aminopropyl trimethoxysilane, etc., epoxy system such as 3-glycidoxypropyl trimethoxysilane, etc., metacryloxy system or mercapto system such as 3-metacryloxypropyl methyldimethoxysilane, etc., sulfide system, vinyl system, ureido system, etc. can be noted as the coupling agent which can be used for the coating composition 20.

Further, halogen-containing compound such as trifluoropropyl trimethoxysilane and methyltrychlorosilane, etc., alkyl group-containing compound such as dimethyldimethoxysilane and methyltrymethoxysilane, etc., silazane compound such as 1,1,1,3,3,3-hexamethyldisilazane, etc., oligomer, etc. such as methylmethoxysiloxane, etc. can be noted as the silicon analog which can be used for the coating composition 20.

The contained amount of the above additives can be appropriately adjusted according to the selected additives, without specific limitation, unless it is within a sufficient range not to lose the antifouling property, the initial hydrophilia, and the continuous hydrophilic property for a long term of the coating composition 20.

Conventional known methods can be used as a method for coating the coating composition 20 of the invention on the surface of article without specific limitation; however, it is desired to remove excess coating composition 20 by airflow after the coating composition 20 is applied on the surface of article to be coated. If excess coating composition 20 stays on the surface of article, the coating film 3 formed there becomes thick, and thus the strength may be decreased so that the silica film 4 may easily get a crack, or the silica film 4 may become clouded to degrade the color tone or texture of the article to be coated.

Further, in order to dry excess coating composition 20, the drying time becomes longer. The increase of drying time is not only undesirable for manufacturing products, but also it may cause the fluorine resin particle 2 to accumulate on the air interface during drying, which increases the hydrophobicity of the obtained coating film 3 so that the hydrophobic fouling substance 6 easily sticks to the coating film, and thus it may be impossible to obtain high antifouling property. If a method to remove excess coating composition 20 by airflow is used, such method brings an effect to not only remove excess coating composition 20, but also to accelerate drying by the airflow, and thus there is an advantage that an excellent coating film in which the fluorine resin particles 2 are moderately dotted in the silica film 4 can be obtained.

When the excess coating composition 20 is removed by airflow from the article to be coated, it is desired that temperature of the airflow should be equal to or less than 110° C., preferably equal to or less than 90° C. If the temperature of the airflow is too high, the silica film 4 may be transformed so that the formed coating film 3 tends to have high hydrophobicity, and the hydrophobic fouling substance 6 easily sticks to the coating film, which is not preferable. As for lower limit of the temperature of the airflow, the temperature equal to or less than 35° C. extends the drying time, as discussed above, it is undesirable on the manufacturing process, and further it is not preferable since the obtained coating film 3 may have high hydrophobicity.

As for the time for blowing the airflow, although it is not to be limited, since it depends on the temperature of airflow or the shape of article to be coated, it is preferable that the blowing time should be no fewer than 2 seconds, nor more than 20 seconds for articles of simple shape. For articles of complex shape such as having a minute gap or a hole, the blowing time should be no fewer than 5 seconds, nor more than 50 seconds. If the blowing time is short, the excess coating composition 20 tends to remain; and if it takes too long, as discussed above, it is undesirable on the manufacturing process, and further it is not preferable since the obtained coating film 3 may have high hydrophobicity.

As a method for applying the coating composition 20 of the invention to the surface of article to be coated, without specific limitation, a method to cover the surface of article with the coating composition 20 such as immersion coating or pouring coating, etc. can be used, so that it is possible to form a uniform coating film 3 having no uncoated part and an even thickness with little unevenness, and thus it is desirable. Using immersion coating or pouring coating methods, it is possible to cover the surface of articles with the coating composition 20 without failure.

In order to obtain the coating film 3 with little unevenness in the thickness, it is desirable to use the above method to remove the excess coating composition 20 with the airflow. In case of the immersion coating, it is also desirable to use a method to raise the article to be coated slowly from the coating resolution (the coating composition 20), remove the excess coating composition 20 by flowing down of the coating resolution, and suppress unevenness; in case of the immersion coating or the pouring coating, it is also desirable to use a method to revolve the article to be coated and throw off to remove the excess coating composition 20.

In case of coating the heat exchanger 30 with the coating composition 20 of the present invention, it is possible to easily and thoroughly cover the surface of a plenty of metal fins 9 which are aligned in parallel with a predetermined interval by immersing the heat exchanger 30 in the coating resolution (the coating composition 20) and raising slowly.

The above commercially available colloidalsilica, as-is, contains equal to or greater than 0.5% in the ratio by weight of natrium to silica. Dispersion liquid of silica composed by using liquid glass (silicate soda), which is easily available and inexpensive, as raw material contains equal to or greater than 0.5% in the ratio by weight of natrium to silica and is alkaline, around pH 10 (approximate 8 to 11). In order to remove natrium being impurities from such dispersion liquid, by passing the coating resolution after mixing with the dispersion liquid of the fluorine resin particles 2 or the dispersion liquid of the silica microparticles 1 (colloidalsilica, for example) before mixing through strongly acidic cation-exchange resin (also referred to as cationic resin), it is possible to carry out hydrogen displacement of natrium. For exchanging sodium ion to hydrogen ion, hydrogen type exchange resin is used.

The strongly acidic cation-exchange resin includes sulfonic acid group (—SO3H) as an exchange group. The exchange resin is dissociated to show strong acidity similarly to hydrochloric acid and sulfuric acid, etc., and can exchange cation such as sodium ion and calcium ion, so that the strongly acidic cation-exchange resin is widely used in various field such as refinement of medical product or food product, catalytic agent, etc. as well as water treatment of purifying or softening water. The strongly acidic cation-exchange resin can be used for all pH region (0 to 14), and it is stable in any temperature, so that it withstands high temperature of 100 to 120° C. The sulfonic acid group (—SO3H) being the exchange group is strongly acidic, and it gets dissociated, needless to say in alkaline side, even in acidic solution into SO3(−)H(+).

At this time, —SO3 is called as a fixed ion, +H is as a counter ion, and it is assumed that X is matrix of cation exchange resin and Y is matrix of dispersion liquid of the silica microparticles 1. In the strongly acidic cation-exchange resin, as shown in Expression 1, sodium ion in the dispersion liquid of the silica microparticles 1 is exchanged into hydrogen ion, and the contained amount (concentration) of sodium ion is decreased.

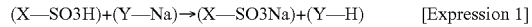

(X—SO3H)+(Y—Na)→(X—SO3Na)+(Y—H)    [Expression 1]

By exchanging sodium ion into hydrogen ion with the strongly acidic cation-exchange resin, the dispersion liquid of the silica microparticles 1 being alkaline of pH 8 to 11 is made acidic of approximate pH 2 to 3. Like this, it is possible to adjust decreasing degree of natrium using pH as a rough indication. It is convenient to blend the coating solution (the coating composition 20) after adjusting pH of the dispersion liquid of the silica microparticles 1 to acidity, since the concentration of natrium being impurities in the coating solution can be grasped. Ion exchange can be done after mixing with the dispersion liquid of the fluorine resin particles 2 to become the coating solution status; however, it is difficult to grasp the concentration of natrium from the coating solution after exchanging ions, since the large part of the coating solution is water, pH of which is in intermediate region. Here, the method to remove or reduce natrium from the dispersion liquid of the silica microparticles 1 or the coating solution is not limited to ion exchange by the strongly acidic cation-exchange resin, but other methods can be used.

Here, according to an article to be coated by the coating composition 20, pretreatment such as corona treatment, UV treatment, etc. can be done beforehand on the surface of article, from a viewpoint of improving the hydrophilia and adhesion of the coating film 3 formed on the surface of article after the coating composition 20 is dried. Since in the coating composition 20 of the invention, the silica microparticles 1 are solidified only by drying, it is possible to expose the fluorine resin particles 2 on the surface of the coating film 3 without heating, etc.

The heat exchanger 30 shown in FIG. 5 is coated by the coating composition 20 of the invention, and the coating film 3 is formed on the surface. As discussed above, since the coating film 3 by the coating composition 20 has excellent antifouling property for both of the hydrophilic fouling substance 5 and the hydrophobic fouling substance 6, it is possible to prevent sticking of the hydrophilic fouling substance 5 and the hydrophobic fouling substance 6 to the heat exchanger 30, which enables to prevent contamination. Since working fluid such as refrigerant, etc. and the air for exchanging heat pass through the heat exchanger 30, the sticking of the hydrophilic fouling substance 5 and the hydrophobic fouling substance 6 to the surface increases pressure loss of the air passage by interrupting the airflow, which degrades the heat transfer efficiency. However, since the heat exchanger 30 coated by the coating composition 20 can prevent sticking of the hydrophilic fouling substance 5 and the hydrophobic fouling substance 6, it is possible to prevent degradation of the heat transfer efficiency due to the sticking of the hydrophilic fouling substance 5 and the hydrophobic fouling substance 6, and further to maintain the high heat transfer efficiency for a long time.

Further, as discussed above, the coating film 3 by the coating composition 20 has excellent initial hydrophilia and continuous hydrophilic property for a long term, the waterdrops 11 of the dewed water attached to the surface of the fins 9 of the heat exchanger 30 can spread very easily, so that the contact angle θ of the waterdrops 11 can be made small. The waterdrops 11 of which the contact angle θ is large or the waterdrop which bridges the fins 9 located next to each other since the contact angle θ is large increases pressure loss of the air passage by interrupting the airflow passing through the heat exchanger 30, which degrades the heat transfer efficiency of the heat exchanger 30. However, in the heat exchanger 30 coated by the coating composition 20, it is possible to maintain the contact angle θ of the waterdrops 11 of the dewed water small for a long term and the waterdrop 11 would not bridge, so that the degradation of the heat transfer efficiency due to the attached dewed water can be suppressed, and thus it is possible to maintain high heat transfer efficiency for a long term.

Further, since the heat exchanger 30 can maintain the contact angle θ of the waterdrops 11 of the dewed water attached to the surface of the fins 9 small for a long term as discussed above, it is possible to prevent waterdrop flying which is the waterdrop 11 separated from the surface of the fins 9 and pushed out together with the passing air and abnormal sound generated by the backflow of the air which passes the heat exchanger 30 and is blown out, which may occur because of increase of pressure loss of the air passage. Further, since the contact angle θ of the attached waterdrops 11 can be made small, it is possible to prevent the dewed water from bridging the fins located next to each other. If the dewed water bridges, the friction resistance works to both fins 9 and thus the dewed water cannot fall easily, which causes bad drainage. However, the heat exchanger 30 coated by the coating composition 20 can prevent the dewed water from bridging the fins 9, so that it is possible to avoid the degradation of the drainage and not to disturb high drainage by the continuous silica film 4.

Further, as discussed above, the coating film 3 by the coating composition 20 absorbs less amount of calboxylic acid such as formic acid, and the attached waterdrops 11 would not become less than pH 4 which generates acid dissolution on the copper pipe even if the ambient formic acid environment is 5 ppm which is the maximum value of the environmental concentration. Therefore, in this heat exchanger 30, the dewed water attached to the surface of the fins 9 would never be less than pH 4, and even if the dewed water is transferred to the piping 10 (copper pipe) from the surface of the fins 9 and the waterdrop 11 of the dewed water contacts the piping 10, ant nest corrosion would never grow on the piping 10. This heat exchanger 30 coated by the coating composition 20 so safe that it can avoid generation of the event that a hole is opened at the piping 10 due to such corrosion and that working fluid leaks from it.

Further, as discussed above, the coating film 3 by the coating composition 20 absorbs small amount of grease system acidic gas (organic acid) such as stearic acid and palmitic acid. The large amount of absorbed organic acid may cause waterdrop flying or generation of abnormal sound caused by the backflow of the air which passes the heat exchanger 30 and is blown out. However, since the heat exchanger 30 coated by the coating composition 20 absorbs small amount of the organic acid, it is possible to avoid waterdrop flying or generation of abnormal sound caused by the backflow of the blown out air, and further it is possible to prevent corrosion, discoloration, or smell generated by the absorption of organic acid.

Figure 6:
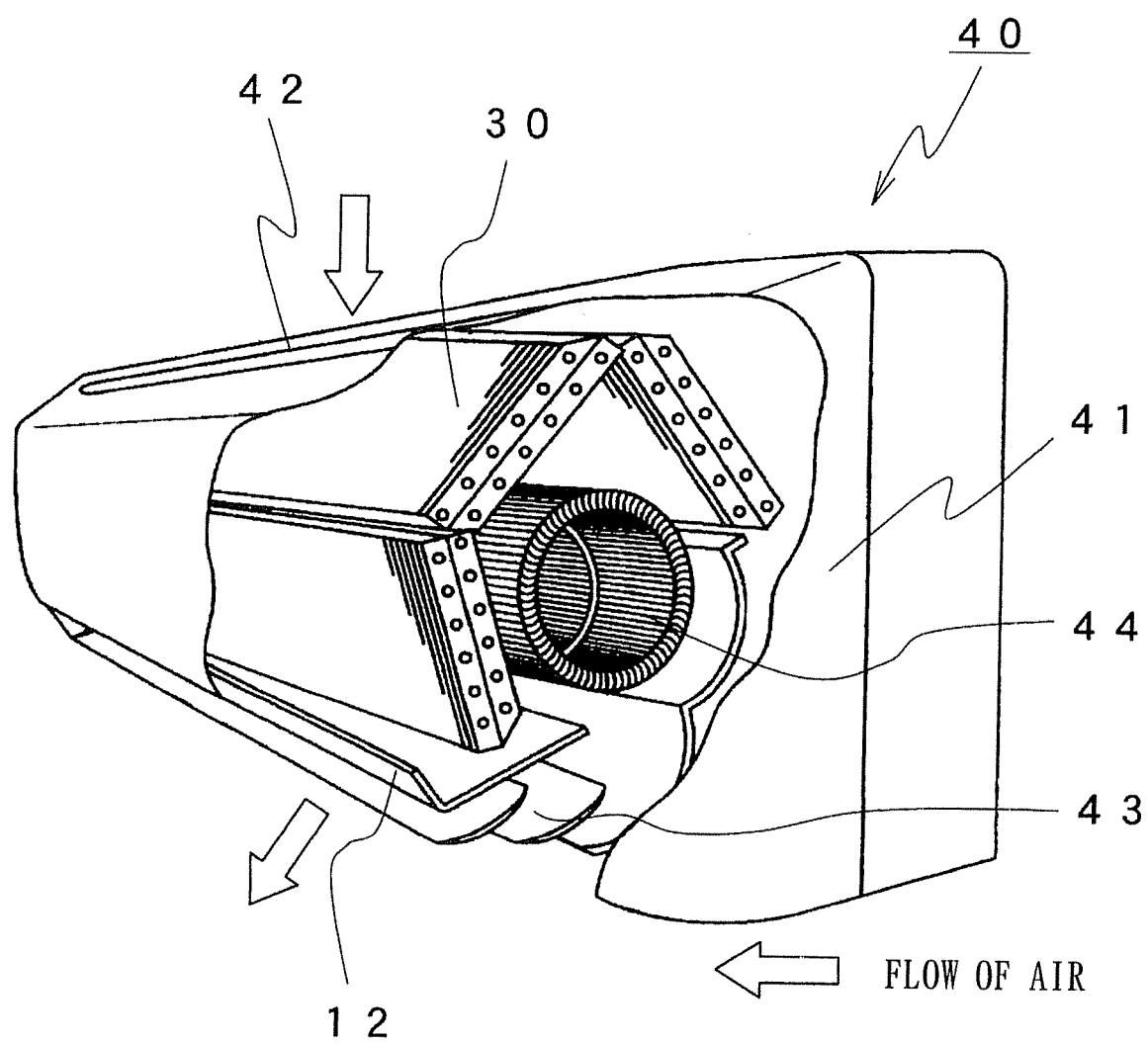
FIG. 6 is a slanted diagram showing an indoor unit of an air-conditioner which mounts the heat exchanger coated by the coating composition of the present invention.

FIG. 6 is a perspective view showing a silica film 40 of an air-conditioner which mounts the heat exchanger coated by the coating composition 20. In FIG. 6, the heat exchanger 30 is contained inside of a cabinet 41. Similarly, inside of the cabinet 41, a crossflow fan 44 which is an air blower is provided in the downstream of the heat exchanger 30. In the upper part of the cabinet 41, an inlet 42 to suck indoor air is provided, and in the lower part of the cabinet 41, an outlet 43 to blow out the conditioned air after the indoor air sucked from the inlet 42 passes through the heat exchanger 30 and heat exchange is done.

The heat exchanger 30 includes a dogleg front face part and a back face part, which are located so as to cover the crossflow fan 44. By revolution of the crossflow fan 44, the indoor air is sucked from the inlet 42 with its suction operation and passes through the heat exchanger 30. On passing through the heat exchanger 30, the indoor air is exchanged its heat with refrigerant which flows in the piping 10 of the heat exchanger 30 and becomes conditioned air. Even if the indoor air sucked from the inlet 42 includes the hydrophilic fouling substance 5 or the hydrophobic fouling substance 6, since the coating film 3 by the coating composition 20 of the invention is formed on the surface of the heat exchanger 30, the fouling would not stick to the surface, which prevents contamination.

By continuous revolution of the crossflow fan 44, the conditioned air after passing through the heat exchanger 30 is blown out indoors from the outlet 43 through the blowing air passage which is located from the crossflow fan 44 to the outlet 43 in the downstream of the crossflow fan 44. An air direction adjusting board is provided at the outlet 43 to adjust the air direction of the conditioned air blown out, and the blowing direction is adjusted. A back side of a nozzle which forms the upper face of the blowing air passage forms the drain-pan 12 to temporarily reserve the waterdrops 11 which attach to the heat exchanger 30, that functions as an evaporator at the time of cooling operation or dehumidifying operation, and fall down from the heat exchanger 30. The dewed water reserved in the drain-pan 12 is discharged outdoors through a drain hose, not illustrated.

This indoor unit 40 can prevent contamination and maintain cleanness for a long term since the heat exchanger 30 coated by the coating composition 20 is contained, and the indoor air is heat exchanged with the refrigerant by the heat exchanger 30. Further even if dewed water is attached to the heat exchanger 30 at the time of cooling operation or dehumidifying operation, since the contact angle θ of the dewed water is small, and the drainage is excellent, it is possible to avoid waterdrop flying which is dewed water blown out together with the conditioned air and abnormal sound, so-called surging sound, generated by the backflow of the air which passes the heat exchanger 30 and is blown out, which may occur because of increase of pressure loss of the air passage.

Further, since in the indoor unit 40, the contained heat exchanger 30 would not allow the hydrophilic fouling substance 5 and the hydrophobic fouling substance 6 to stick for a long term, and the contact angle θ of the attached dewed water can be made small, the pressure loss of airflow passing through the heat exchanger 30 would not be generated, the heat transfer efficiency can be maintained high for a long term, and thus the air-conditioner with high efficiency can be obtained.

Further, in the indoor unit 40, the contained heat exchanger 30 absorbs small amount of calboxylic acid such as formic acid, and ant nest corrosion would not occur on the piping 10. The event that a hole is opened to allow the refrigerant to leak from it can be avoided, and the air-conditioner becomes safe and eco-friendly. Further, since the heat exchanger 30 absorbs small amount of organic acid such as calboxylic acid, the indoor unit 40 would not blow uncomfortable smell caused by the organic acid, and corrosion or discoloring caused by the organic acid would not occur.

Further, although it is not illustrated in FIG. 6, in an indoor unit of a common air-conditioner, an air filter is provided between the inlet and the heat exchanger, and this air filter catches fouling substances included in the indoor air sucked from the inlet to prevent such fouling substances from reaching the heat exchanger. In this indoor unit 40, since the heat exchanger 30 has excellent antifouling property by the coating film 3, the air filter can have more coarse mesh than the conventional one. Therefore, the pressure loss of the inflow air due to the air filter can be decreased, and thus the efficiency of the air-conditioner can be increased.

Here, the air-conditioner, the heat exchanger 30 of which the surface is coated by the coating film 3 formed by the coating composition 20 of the invention is applied to the indoor unit 40, has been explained as an example; however, the heat exchanger 30 can be applied to a heat exchanger of the outdoor unit placed outdoors and the outdoor unit can include the heat exchanger 30 inside of the body. One of the heat exchangers of the indoor unit or the outdoor unit can be the heat exchanger 30, on the surface of which the coating film 3 is formed by coating with the coating composition 20 of the invention. Further, it is also applicable to a heat exchanger of a refrigeration air-conditioner employing a refrigeration cycle without distinguishing an indoor/outdoor unit such as a refrigerator, a car air-conditioner, an automatic vending machine, etc., which can obtain the same effect.

Further, the application of the coating composition 20 according to the present invention is not limited to the heat exchanger 30, but the coating composition 20 can be also applied to coating of the surfaces of various articles. As articles to be applied, without specific limitation, various articles to which various contamination (the hydrophilic fouling substance 5 and the hydrophobic fouling substance 6) such as powder dust, greasy fume, tobacco tar, etc. may stick can be noted regardless of whether it is used indoors/outdoors, since the antifouling property is excellent.

Further, since the initial hydrophilia and the continuous hydrophilic property for a long term are excellent, it is convenient to apply the invention to products which routinely contact water, scoop water, are exposed to water, discharge water attached to the surface, since not only the antifouling effect but also high hydrophilia and good drainage effect can be obtained. Concrete examples are a hand-drier to blow away water attached to hands, a disk humidifier to scoop collected water by a flat plate, a ventilation fan to suck steam or greasy fume, a lavatory bowl, outer coating or a mirror of a car, window glass of a car or a building, a mirror of a bathroom or a washing room, a guard mirror, a roof or outer wall of a building, dishes, kitchen equipments, bathroom equipments, etc.

Embodiments

Hereinafter, by showing concrete embodiments, a detailed experimental result and features of the coating composition 20 of the present invention will be explained. However, the following embodiments will not limit the range of the invention. As a test slip the surface of which is coated to form a coating film, an aluminum fin for a heat exchanger is used. Antiseptic treatment (a corrosion prevention layer is formed on the aluminum layer of raw material by chromate treatment) is done on the aluminum fin of the test slip.

Embodiments 1 through 3

In Embodiments 1 through 3, after mixing and stirring colloidalsilica (produced by JGC Catalysts and Chemicals Ltd., pH 10) in which silica microparticles having the average particle diameter of 6 nm is dispersed in purified water and PTFE dispersion (produced by ASAHI Glass, Co. Ltd., pH 10) in which fluorine resin particles having the average particle diameter of 150 nm is dispersed in purified water, and by further adding, mixing and stirring nonionic surfactant (polyoxyethylene alkylester), the coating composition having composition shown in Table 1 is dispensed. The contained amount of nonionic surfactant in the coating composition is 0.05% by weight. The surface of the test slips are coated by these coating compositions.

Here, from colloidalsilica, Na ion is decreased using strongly acidic cation-exchange resin (daiaion UBK08) prior to mixing with PTFE dispersion. The degree of decrease is varied by changing the amount of strongly acidic cation-exchange resin. The contained amount of natrium is measured by atomic absorption analysis. Before performing ion exchange, the contained amount of natrium of colloidalsilica is 1.3% in the ratio by weight to the silica microparticles; after performing ion exchange, the contained amount become 0.5% and 0.1%, respectively. Then, after ion exchange is done, the pH value of colloidalsilica is 2.3.

Comparison Examples 1, 2

In Comparison Example 1, hydrophilic coating using silicate glass (also called as liquid glass, SiO2/Na2O), which is conventionally used for the heat exchanger of the air-conditioner, is applied to the test slip. In Comparison Example 1, the ratio by weight of natrium to silica is 33%. Further, in Comparison Example 2, organic hydrophilic coating using polyvinylalchol (also called as poparl, PVA), which is also conventionally used for the heat exchanger, is applied to the test slip. The hydropholic coating by organic resin in Comparison Example 2 does not include silica or natrium.

TABLE 1

|  | Ratio of silica microparticles to coating composition (% by weight) | Ratio of fluorine resin particles to coating composition (% by weight) | Ratio of natrium to silica microparticles in coating composition (% by weight) |
|---|---|---|---|
| Embodiment 1 | 1.5 | 0.5 | 1.3 |
| Embodiment 2 | 1.5 | 0.5 | 0.5 |
| Embodiment 3 | 1.5 | 0.5 | 0.1 |
| Comparison Example 1 | — (silicate soda used) | — | 3.3 |
| Comparison Example 2 | — (PVA used) | — | — |

In order to evaluate the continuous hydrophilic property in each example, the coated test slip is immersed in running water of ion-exchange water of 2 L/min. and left in a predetermined time period, pulled out, and dried, and then the contact angle θ with water is measured. Table 2 shows its result. The contact angle θ is measured using a contact angle meter (produced by Kyowa Interface Science Co. Ltd., DM100). Here it is assumed that the running water of 13,000 L corresponds to approximate a product life of the air-conditioner. By contacting with the running water for a long term (about 108 hours of test time in case of 13,000 L), the contact angle θ becomes large.

This is because, as discussed above, dispersion of natrium in the running water accelerates resolution of silica at the same time, and resolution of silica causes the water-repellency of the fluorine resin to effect largely. In case of an air-conditioner on market product, for example, if the contact angle θ is equal to or less than 40 degrees, as a rough indication, the waterdrop flying hardly occurs; however, if the contact angle θ is equal to or greater than 60 degrees, the waterdrop flying possibly occurs.

As shown in Table 2, in Embodiment 1 in which the contained amount of natrium is 1.3% in the ratio by weight to silica and Comparison Example 1 in which the contained amount is 33%, the contact angle θ clearly increases after exposed to the running water. On the contrary, in Embodiment 2 in which the contained amount of natrium is 0.5% in the ratio by weight to silica and Embodiment 3 in which the contained amount is 0.1% in the ratio by weight, the contact angle θ increases with a small amount similarly to Comparison Example 2; the contact angle θ is equal to or less than 40 degrees after exposed to 13,000 L, which satisfies the rough indication to prevent the waterdrop flying.

The experimental result of Table 2 shows, if the contained amount (concentration) of natrium is small by decreasing effect of natrium using the cation-exchange resin, it is possible to suppress the degradation of the hydrophilia; that is, the continuous hydrophilic property is high. When the contained amount of natrium is made equal to or less than 0.5% in the ratio by weight to silica microparticles, the continuous hydrophilic property which satisfies the contact angle θ≦40 degrees can be obtained.

TABLE 2

|  | Initial contact angle θ | Contact angle θ after exposed to running water of 6500 L | Contact angle θ after exposed to running water of 13000 L |
|---|---|---|---|
| Embodiment 1 | 15° | 39° | 67° |
| Embodiment 2 | 16° | 25° | 38° |
| Embodiment 3 | 13° | 22° | 32° |
| Comparison Example 1 | 19° | 43° | 65° |
| Comparison Example 2 | 14° | 23° | 35° |

Next, in order to evaluate the absorbed amount of formic acid in each example, the coated test slip is exposed in the formic acid resolution with a predetermined concentration in a container with a predetermined size kept in constant temperature and humidity. The test slip is pulled out after being exposed for a predetermined time period, the absorbed amount of formic acid per unit area is measured by water-extraction ion chromatography method. Table 3 shows its result. Here, the rough indication of the absorbed amount with which no problem occurs theoretically (the dewed water attached to the fin is less than pH 4 and does not cause ant nest corrosion on the copper pipe) even if the ambient environment is 5 ppm which is the maximum value of the formic acid environmental limit is equal to or less than 15 ng/cm2.

In Comparison Example 1 in which the contained amount of natrium is 33% in the ratio by weight to silica, excessive amount of formic acid of 300 to 500 ng/cm2 is absorbed. Further, also in Embodiment 1 in which the contained amount of natrium is 1.3% in the ratio by weight to silica, formic acid of 33 ng/cm2, which is as three times as much as Embodiment 2 in which the contained amount of natrium is 0.5% in the ratio by weight to silica, is absorbed. In Embodiment 2 in which the contained amount of natrium is 0.5% in the ratio by weight to silica and Embodiment 3 in which the contained amount is 0.1% in the ratio by weight, small amount being equal to or less than 15 ng/cm2 of formic acid is absorbed similarly to Comparison Example 2 in which natium is not contained, so that even if the ambient environment is 5 ppm which is the maximum value of the formic acid environmental limit, the pH value of the dewed water attached to the fin of the heat exchanger is less than 4, and there is no danger to cause corrosion generated on the copper pipe in which the refrigerant flows.

Experimental result of Table 3 shows that by decreasing effect of the contained amount (concentration) of natrium using the cation-exchange resin, the absorption of formic acid can be suppressed. By making the contained amount of natrium equal to or less than 0.5% in the ratio by weight, absorption proof property can be obtained so as to satisfy the absorbed amount of formic acid $\leqq 15$ ng/cm2.

TABLE 3

|  | Absorbed amount of formic acid per unit area (ng/cm$^2$) |
| --- | --- |
| Embodiment 1 | 33 |
| Embodiment 2 | 12 |
| Embodiment 3 | 9 |
| Comparison Example 1 | 300 to 500 |
| Comparison Example 2 | 9 |

From the experimental result shown in Tables 2 and 3 discussed above, it is possible to determine that coating with Embodiment 3 and Comparison Example 2 is appropriate from the viewpoint of the initial hydrophilia, the continuous hydrophilic property, and the absorption proof property. Subsequently, the antifouling property is evaluated. Further, the optimal ratio by weight of the silica microparticles and the fluorine resin particles (weight of silica micropartile: weight of fluorine resin particles) for the coating composition will be evaluated.

Embodiments 3 through 8

In Embodiments 3 through 8, in order to find the optimal ratio by weight of the silica microparticles and the fluorine resin particles, after mixing and stirring colloidalsilica (including the average particle diameter of 6 nm) in which the contained amount of natrium is decreased to 0.1% in the ratio to silica and is pH 2.3 and PTFE dispersion (including fluorine resin particle having the average particle diameter of 150 nm) by changing respective ratio, and by further adding, mixing and stirring nonionic surfactant (polyoxyethylene alkylester), the coating composition having composition shown in Table 4 is dispensed. The ratio by weight of the silica microparticles and the fluorine resin particles is changed within a range of 30:70 through 90:10. Here, the contained amount of the nonionic surfactant in the coating composition is 0.05% by weight in each case.

Comparison Examples 2 Through 5

In Comparison Examples 3 and 4, colloidalsilica of pH 2.3 in which the above natrium concentration is decreased to 0.1% and the above PTFE dispersion are respectively used as a single body. In Comparison Example 5, though the ratio by weight is the same as Embodiment 8, the ratio by weight of the silica microparticles to the coating composition is raised, that is, the concentration of microparticles is raised, and the coating composition is dispensed. Comparison Example 2 is organic resin hydrophilic coating using PVA (polyvinyl alcohol) which is conventionally used as discussed above, and does not include silica nor fluorine resin.

TABLE 4

|  | Ratio of silica microparticles to coating composition (% by weight) | Ratio of fluorine resin particles to coating composition (% by weight) | Ratio by weight of silica microparticles to fluorine resin particles |
| --- | --- | --- | --- |
| Embodiment 4 | 0.5 | 1.2 | 30:70 |
| Embodiment 5 | 0.5 | 0.5 | 50:50 |
| Embodiment 6 | 0.8 | 0.5 | 60:40 |
| Embodiment 3 | 1.5 | 0.5 | 75:25 |
| Embodiment 7 | 2.8 | 0.5 | 85:15 |
| Embodiment 8 | 2.3 | 0.25 | 90:10 |
| Comparison Example 3 | 2.0 | — | 100:0 (only silica) |
| Comparison Example 4 | — | 1.0 | 0:100 (only fluorine resin) |
| Comparison Example 5 | 6.3 | 0.7 | 90:10 |
| Comparison Example 2 | — (PVA used) | — | — |

Coating composition of each example is coated on the test slip, excessive liquid is blown away by air-blow, and the coating film is formed on the test slip. Characteristics and the initial contact angle θ, and the antifouling property are evaluated, respectively. Here, the air-blow with 30 m/s flow velocity is used. Here, characteristics of the coating film is evaluated by visual observation. The contact angle θ is measured using a contact angle meter (produced by Kyowa Interface Science Co. Ltd., DM100). Evaluation of the antifouling property is done by evaluating sticking tendency of sand dust which is hydrophilic fouling substance and sticking tendency of carbon power dust which is hydrophobic fouling substance.

To evaluate sticking tendency of the hydrophilic fouling substance, by spraying JIS Kanto loamy layer powder dust having median particle diameter of 1 to 3 μm with air to the coated surface (coating film), coloring of red powder dust of Kanto loamy layer is evaluated by visual observation into five levels. In this evaluation, 1 is for a case in which little powder dust of Kanto loamy layer sticks, and 5 is for a case in which much powder dust of Kanto loamy layer sticks. Further, to evaluate sticking tendency of the hydrophobic fouling substance, by spraying greasy carbon black with air to the coated surface (coating film), coloring of black color of carbon black is evaluated by visual observation into five levels. In this evaluation, 1 is for a case in which little carbon black sticks, and 5 is for a case in which much carbon black sticks.

TABLE 5

|  | Property of coating film | Initial contact angle θ | Evaluation of sticking tendency of hydrophilic fouling substance (sand dust of Kanto loamy layer) | Evaluation of sticking tendency of hydrophobic fouling substance (carbon powder dust) |
| --- | --- | --- | --- | --- |
| Embodiment 4 | transparent film | 32° | 1 | 3.5 |
| Embodiment 5 | transparent film | 17° | 1.5 | 3 |
| Embodiment 6 | transparent film | 14° | 1 | 2.5 |
| Embodiment 3 | transparent film | 13° | 1 | 1.5 |
| Embodiment 7 | slightly clouded film | 12° | 2.5 | 1 |
| Embodiment 8 | transparent film | 11° | 3 | 1 |
| Comparison Example 3 | transparent film | 10° | 5 | 4 |
| Comparison Example 4 | separation of clouded film | 90° | 3 | 5 |
| Comparison Example 5 | separation of clouded film | — | 5 | 5 |
| Comparison Example 2 | transparent film | 14° | 5 | 5 |

As shown in Table 5, in case of the coating composition of Comparison Example 4 (coating composition containing only fluorine resin particles without silica microparticles), the initial contact angle θ is 90°, so that the hydrophilia is very poor. Further, the coating film is largely clouded, and it is easily separated from the surface of test slip. Further, in case of the coating composition of Comparison Example 5 (coating composition containing large amount of silica microparticles), the coating film has uneven thickness and is clouded, and it gets crack and is separated easily.

Contrary to this, in cases of Embodiments 3 through 8 and Comparison Examples 2 and 3, the thin coating film can be formed with an even thickness. In case of Embodiment 7, the film is slightly clouded; however, in the other examples, the transparent film can be formed. When Embodiment 8 is compared with Comparison Example 5, it is understood that the characteristics of the films may vary even if the ratio by weight is the same. When the contained amount (concentration) of silica microparticles is high (exceeding 5% by weight), the coating film to be formed has the uneven thickness and becomes clouded.

Looking at Table 5 from the viewpoint of antifouling property, in cases of Comparison Examples 2 through 5, the sticking amount of hydrophilic fouling substance and hydrophobic fouling substance are both large. In particular, in case of Comparison Example 2 which is the organic hydrophilic coating of the conventional heat exchanger of which the continuous hydrophilic property is excellent, the sticking amount of hydrophilic fouling substance and hydrophobic fouling substance are both large, which shows the Example does not have antifouling property.

Contrary to this, the coating films formed by the coating composition according to Embodiments 3 through 8 all show excellent antifouling property for both of hydrophilic fouling substance and hydrophobic fouling substance. However, in case of Embodiment 4 in which the ratio by weight of fluorine resin particles is high (weight of silica microparticles: weight of fluorine resin particles=30:70), the antifouling property for the hydrophobic fouling substance is slightly poor.

In order to accomplish antifouling property for both of hydrophilic fouling substance and hydrophobic fouling substance, Embodiments 3, 6, and 7, in which the ratio by weight of the fluorine resin particles to the silica microparticles is 60:40 through 85:15, are especially preferable. Further, more in detail, Embodiment 3 in which the ratio by weight is 75:25 is the most preferable. From the experimental result shown in Table 5, it is understood that by controlling the contained amount (the ratio by weight) of the silica microparticles and the fluorine resin particles, macroscopic characteristics (hydrophilia or hydrophobicity) of the coating film to be formed can be controlled. Further, in case of Embodiment 4 in which the ratio by weight the silica microparticles is low, the initial contact angle θ exceeds 30°; if the ratio by weight of the silica microparticles is higher than a case in which the ratio by weight of the fluorine resin particles to the silica microparticles is 60:40, the initial contact angle θ is less than 20°, which shows excellent hydrophilia.

Further, the continuous hydrophilic property is evaluated for Embodiments 5 through 7. The evaluation method is the same as Embodiments 1 through 3 shown in Table 2; the coated test slip is immersed in running water of ion-exchange water of 2 L/min. and left in a predetermined time period, pulled out, and dried, and then the contact angle θ of the attached water is measured. Table 6 show its result. Embodiment 5 in which the ratio by weight of the silica microparticles to the fluorine resin particles is 50:50, the contact angle θ is clearly degraded to 68 degrees after exposed to water of 13,000 L; that is, the continuous hydrophilic property is poor. On the contrary, Embodiment 6 in which the ratio by weight is 60:40 and Embodiment 7 in which the ratio by weight is 75:25 after exposed to water of 13,000 L satisfy the rough indication of the contact angle θ≦40 degrees for preventing waterdrop flying. From this, from the viewpoint of continuous hydrophilic property, it is better to contain the silica microparticles of which the ratio by weight of the fluorine resin particles to the silica microparticles is higher than 60:40; more in detail, Embodiment 3 in which the ratio by weight is 75:25 is the most preferable.

TABLE 6

|  | Initial contact angle θ | Contact angle θ after exposed to running water of 13000 L |
| --- | --- | --- |
| Embodiment 5 | 17° | 68° |
| Embodiment 6 | 14° | 40° |
| Embodiment 7 | 12° | 32° |

Here, in Embodiments 3 through 8, while the average particle diameter of the fluorine resin particles is 150 nm, the average thickness of the silica film is approximate 100 nm, which is smaller (thinner) than the average particle diameter of the fluorine resin particles. If the air-blow is insufficient and the thickness of the silica film becomes thick such as around 1000 nm, the initial contact angle θ is large, and the continuous hydrophilic property is degraded, and the contact angle θ is increased compared with the initial contact angle. Further, the antifouling property is degraded for both of the hydrophilic fouling substance and the hydrophobic fouling substance. From the above discussion, it is important to control appropriately at least the contained amount (concentration) of natrium being impurities, the contained amount of silica microparticles and fluorine resin particles, the ratio by weight of the silica microparticles to the fluorine resin particles, and the thickness of the silica film.

Further, Embodiment 3 and Comparison Example 2 are compared from the viewpoint of dynamic contact angle. The test slips, to which the coating of Embodiment 3 and Comparison Example 2 are applied, are made to stand vertically, waterdrops of 20 μL (microliter) are attached by syringe, and the waterdrop moving distance after 0.5 minutes from the attachment is measured. Embodiment 3 has around five times as higher the waterdrop falling velocity than Comparison Example 2, so that water can be discharged quickly. Further, on the test slips placed horizontally, a time length until the contact angle of the waterdrops of 20 μL reaches the initial contact angle is measured. While it takes about 1 second in Comparison Example, it takes 0.01 second in Embodiment 3, which shows excellent hydrophilia by which the attached waterdrops immediately spread.

Coating composition related to the present invention has an effect to form on the surface of an article a coating film which exercises excellent antifouling property for both of hydrophilic fouling substance and hydrophobic fouling substance, of which the initial hydrophilia and the continuous hydrophilic property are excellent, and further which can suppress absorption amount of calboxylic acid.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

The invention claimed is:

1. A coating composition in the form of a coating film adhered to a surface of an article, the coating composition comprising:
   a silica film composed of silica microparticles; and
   fluorine resin particles arranged in a dotted pattern in the silica film and partially exposed from a surface of the silica film,
   wherein an exposed area of the silica microparticles is larger than an exposed area of the fluorine resin particles,
   wherein amount of natrium contained in the coating composition is less than or equal to 0.5% in a ratio by weight to contained amount of the silica microparticles, and
   wherein an initial contact angle θ of waterdrops attached to a surface, of the coating film is equal to or less than 30 degrees and a subsequent contact angle θ of waterdrops attached to the surface of the coating film after exposure to 13000 L of running water equal to or less than 40 degrees.

2. The coating composition of claim 1, wherein a ratio by weight of contained amount of the silica microparticles to contained amount of the fluorine resin particles is within a range of 60:40 to 95:5.

3. The coating composition of claim 1, wherein an average particle diameter of the silica microparticles is within a range of 4 to 15 nm.

4. The coating composition of claim 1, wherein an average particle diameter of the fluorine resin particles is within a range of 50 to 500 nm.

5. The coating composition of claim 1, wherein the contained amount of the silica microparticles is 0.1 to 5% by weight to the coating composition.

6. The coating composition of claim 1, wherein in the coating film an average thickness of the silica film is less than an average particle diameter of the fluorine resin particles.

7. The coating composition of claim 1, wherein the coating composition is comprised by mixing a dispersion liquid of the silica microparticles and a dispersion liquid of the fluorine resin particles, and wherein amount of natrium contained in the dispersion liquid of the silica microparticles is reduced to less than or equal to 0.5% by weight to the contained amount of the silica microparticles by hydrogen displacement with cation exchange before or after the dispersion liquid of the silica microparticles is mixed with the dispersion liquid of the fluorine resin particles to form the coating composition.

8. A heat exchanger having a plurality of fins made of metal, which are aligned with a predetermined interval, and a metal piping which is provided in an inserted manner with forming plural lines penetrating the fins, wherein the heat exchanger is coated by the coating composition of claim 1, and the coating film has a continuous hydrophilic property and is formed by the coating composition at least on a surface of the fins.

9. An air conditioner having an indoor unit to be placed indoors and an outdoor unit to be placed outdoors, wherein at least one of the indoor unit and the outdoor unit contains the heat exchanger of claim 8.

10. The coating composition of claim 1, wherein in the coating film an average thickness of the silica film is less than two-thirds of an average particle diameter of the fluorine resin particles.

11. A coating composition including a film coating a surface of a substrate, which comprises:
   a silica film comprised of 0.1 to 5% by weight of silica microparticles based on weight of the coating film, the silica microparticles having an average particle diameter of 4 to 15 nm;
   fluorine resin particles having an average particle diameter of 50 to 500 nm, a weight ratio of the silica microparticles to the fluorine resin particles being in a range of 60:40 to 95:5; and
   0 to 0.5% in ratio by weight of natrium to the weight of the silica microparticles,
   wherein an average thickness of the silica film is less than an average particle diameter of the fluorine resin particles, the fluorine resin particles are partially exposed from a surface of the silica film in a dot pattern, and an exposed area of the silica microparticles is larger than an exposed area of the fluorine resin particles, and
   wherein an initial contact angle θ of waterdrops attached to a surface of the coating film is equal to or less than 30 degrees and a subsequent contact angle θ of waterdrops attached to the surface of the coating film after exposure to 13000 L of running water is equal to or less than 40 degrees.

12. The coating composition of claim 11, wherein the coating composition is prepared by mixing a dispersion liquid of the silica microparticles and a dispersion liquid of the fluorine resin particles, and wherein amount of natrium contained in the dispersion liquid of the silica microparticles is reduced to less than or equal to 0.5% by weight to the contained amount of the silica microparticles by hydrogen displacement with cation exchange before or after the dispersion liquid of the silica microparticles is mixed with the dispersion liquid of the fluorine resin particles to form the coating composition.

13. A heat exchanger having a plurality of fins made of metal, which are aligned with a predetermined interval, and a metal piping which is provided in an inserted manner with forming plural lines penetrating the fins, wherein the heat exchanger is coated by the coating composition of claim 11, and the coating film is formed by the coating composition at least on a surface of the fins.

14. An air conditioner having an indoor unit to be placed indoors and an outdoor unit to be placed outdoors, wherein at least one of the indoor unit and the outdoor unit contains the heat exchanger of claim 13.

15. A coated article comprising a film of a coating composition coating a surface of a substrate,
    wherein an initial contact angle θ of waterdrops attached to a surface of the coating film is equal to or less than 30 degrees and a subsequent contact angle θ of waterdrops attached to the surface of the coating film after exposure to 13000 L of running water is equal to or less than 40 degrees, and
    wherein the coating composition is coated on the surface of the substrate by performing steps (1a) and (1b) in any order, and then performing steps (2) and (3):
    (1a) mixing a dispersion liquid of silica microparticles and a dispersion liquid of fluorine resin particles; and
    (1b) removing natrium from the dispersion liquid of the silica microparticles to less than or equal to 0.5% in ratio by weight to weight of the silica microparticles by hydrogen displacement with cation exchange;
    (2) adhering the mixed dispersion liquids to the surface of the substrate; and
    (3) dehydrating the adhered dispersion liquids and thereby forming the coating film in which an average thickness of a silica film composed of the silica microparticles is less than an average particle diameter of the fluorine resin particles, the fluorine resin particles are partially exposed from a surface of the silica film in a dot pattern, and an exposed area of the silica microparticles is larger than an exposed area of the fluorine resin particles.

16. The coated article of claim 15, wherein the coating composition comprises 0.1 to 5% by weight of the silica microparticles based on weight of the coating film and the fluorine resin particles in a weight ratio of the silica microparticles to the fluorine resin particles of 60:40 to 95:5, wherein the silica microparticles have an average particle diameter of 4 to 15 nm and the fluorine resin particles have an average particle diameter of 50 to 500 nm.

17. The coated article of claim 15, wherein in the coating film an average thickness of the silica film is less than two-thirds of an average particle diameter of the fluorine resin particles.

* * * * *